United States Patent
Lynch et al.

(10) Patent No.: US 12,447,618 B2
(45) Date of Patent: Oct. 21, 2025

(54) TECHNIQUES FOR CONSTRAINING MOTION OF A DRIVABLE ASSEMBLY

(71) Applicant: INTUITIVE SURGICAL OPERATIONS, INC., Sunnyvale, CA (US)

(72) Inventors: Goran A. Lynch, Tahoe City, CA (US); Lucas A. Reilly, Sunnyvale, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 125 days.

(21) Appl. No.: 18/391,473

(22) Filed: Dec. 20, 2023

(65) Prior Publication Data
US 2024/0208055 A1    Jun. 27, 2024

Related U.S. Application Data

(60) Provisional application No. 63/476,508, filed on Dec. 21, 2022.

(51) Int. Cl.
*B25J 9/16* (2006.01)
*A61B 34/30* (2016.01)
(Continued)

(52) U.S. Cl.
CPC ............. *B25J 9/1664* (2013.01); *A61B 34/37* (2016.02); *B25J 9/0084* (2013.01); *A61B 2034/301* (2016.02)

(58) Field of Classification Search
CPC ....... B25J 9/1664; B25J 9/0084; A61B 34/37; A61B 2034/301; A61B 34/30
See application file for complete search history.

(56) References Cited

U.S. PATENT DOCUMENTS

| 8,004,229 B2 | 8/2011 | Nowlin et al. |
| 8,541,970 B2 | 9/2013 | Nowlin et al. |

(Continued)

FOREIGN PATENT DOCUMENTS

| WO | WO-2006124390 A2 | 11/2006 |
| WO | WO-2013071057 A1 | 5/2013 |

(Continued)

OTHER PUBLICATIONS

Vertut, J., and Coiffet, P., "Robot Technology: Teleoperation and Robotics Evolution and Development," English translation, Prentice-Hall, Inc., Inglewood Cliffs, NJ, USA 1986, vol. 3A, 332 pages.

*Primary Examiner* — Bhavesh V Amin
(74) *Attorney, Agent, or Firm* — Artegis Law Group, LLP

(57) ABSTRACT

Techniques for constraining motion of a drivable assembly including a drivable structure, a manipulator mechanically coupled to the drivable structure, and a processing system. The processing system is configured to perform operations including receiving a command. The command indicates a commanded motion for an end effector of an instrument mechanically coupled to the manipulator. The operations also include; determining a drivable structure limit based a type of procedure being performed by the drivable assembly or an operating mode of the drivable assembly. The drivable structure limit defines a limit for motion of the drivable structure. The operations further include determining a movement for effecting the commanded motion. The movement includes a relative motion of the end effector relative to the drivable structure and a drivable structure motion of the drivable structure based on the drivable structure limit. The operations additionally include driving the drivable assembly to perform the movement.

25 Claims, 8 Drawing Sheets

(51) Int. Cl.
*A61B 34/37* (2016.01)
*B25J 9/00* (2006.01)

(56) References Cited

U.S. PATENT DOCUMENTS

| | | | |
|---|---|---|---|
| 8,620,473 B2 | 12/2013 | Diolaiti et al. | |
| 8,624,537 B2 | 1/2014 | Nowlin et al. | |
| 8,749,189 B2 | 6/2014 | Nowlin et al. | |
| 8,749,190 B2 | 6/2014 | Nowlin et al. | |
| 8,786,241 B2 | 7/2014 | Nowlin et al. | |
| 8,816,628 B2 | 8/2014 | Nowlin et al. | |
| 8,823,308 B2 | 9/2014 | Nowlin et al. | |
| 8,843,237 B2 * | 9/2014 | Aurnhammer | G05B 19/416 700/262 |
| 8,903,546 B2 | 12/2014 | Diolaiti et al. | |
| 8,918,211 B2 | 12/2014 | Diolaiti et al. | |
| 9,084,623 B2 | 7/2015 | Gomez et al. | |
| 9,138,129 B2 | 9/2015 | Diolaiti | |
| 9,541,903 B2 * | 1/2017 | Hoover | G04C 3/146 |
| 9,586,323 B2 | 3/2017 | Diolaiti et al. | |
| 9,592,608 B1 * | 3/2017 | Bingham | G05B 19/423 |
| 10,537,351 B2 * | 1/2020 | Shelton, IV | A61B 18/1206 |
| 10,589,428 B1 * | 3/2020 | Linnell | B25J 13/06 |
| 10,843,332 B2 * | 11/2020 | Walsh | B25J 9/0006 |
| 11,324,655 B2 * | 5/2022 | De Rossi | A61H 1/0266 |
| 11,504,192 B2 * | 11/2022 | Shelton, IV | G16H 40/63 |
| 11,656,082 B1 * | 5/2023 | Ebrahimi Afrouzi | G05D 1/0272 700/259 |
| 2004/0039486 A1 * | 2/2004 | Bacchi | H01L 21/68707 700/275 |
| 2007/0010898 A1 * | 1/2007 | Hosek | G05B 19/4148 700/2 |
| 2007/0229015 A1 * | 10/2007 | Yoshida | G05B 19/4061 700/245 |
| 2007/0282228 A1 * | 12/2007 | Einav | A63B 21/00181 600/300 |
| 2008/0133057 A1 * | 6/2008 | Hasegawa | B62D 57/032 901/1 |
| 2009/0308603 A1 * | 12/2009 | Borgstadt | E21B 19/086 166/250.15 |
| 2013/0258819 A1 * | 10/2013 | Hoover | G04C 3/14 702/142 |
| 2014/0039517 A1 * | 2/2014 | Bowling | B25J 9/161 606/130 |
| 2014/0039681 A1 * | 2/2014 | Bowling | A61B 34/30 700/261 |
| 2014/0107841 A1 * | 4/2014 | Danko | B25J 9/1607 700/253 |
| 2014/0222207 A1 * | 8/2014 | Bowling | A61B 17/16 700/261 |
| 2015/0032126 A1 | 1/2015 | Nowlin et al. | |
| 2015/0051733 A1 | 2/2015 | Nowlin et al. | |
| 2015/0214091 A1 * | 7/2015 | Rodnick | B25J 9/1656 700/228 |
| 2015/0374446 A1 * | 12/2015 | Malackowski | A61B 34/20 606/130 |
| 2017/0112580 A1 * | 4/2017 | Griffiths | F16M 13/022 |
| 2018/0089831 A1 * | 3/2018 | Liu | G06T 7/70 |
| 2018/0317898 A1 * | 11/2018 | Plaskos | A61F 2/3859 |
| 2019/0125361 A1 * | 5/2019 | Shelton, IV | A61B 17/1227 |
| 2019/0125454 A1 * | 5/2019 | Stokes | A61B 18/1206 |
| 2019/0125455 A1 * | 5/2019 | Shelton, IV | A61B 5/00 |
| 2019/0125456 A1 * | 5/2019 | Shelton, IV | A61B 17/072 |
| 2019/0125457 A1 * | 5/2019 | Parihar | A61B 17/0206 |
| 2019/0125458 A1 * | 5/2019 | Shelton, IV | A61B 17/072 |
| 2019/0142530 A1 * | 5/2019 | Thompson | A61B 34/25 606/130 |
| 2019/0200977 A1 * | 7/2019 | Shelton, IV | A61B 34/20 |
| 2019/0206565 A1 * | 7/2019 | Shelton, IV | A61B 90/90 |
| 2019/0327394 A1 * | 10/2019 | Ramirez Luna | A61B 34/77 |
| 2019/0374293 A1 * | 12/2019 | Larkin | A61B 34/72 |
| 2020/0225673 A1 * | 7/2020 | Ebrahimi Afrouzi | A47L 11/4011 |
| 2020/0297442 A1 * | 9/2020 | Adebar | A61B 34/30 |
| 2021/0015568 A1 * | 1/2021 | Liao | A61B 34/35 |
| 2021/0089040 A1 * | 3/2021 | Ebrahimi Afrouzi | G05D 1/0248 |
| 2021/0120935 A1 * | 4/2021 | Shashou | B25J 9/026 |
| 2021/0287836 A1 * | 9/2021 | Salerno | B25J 9/12 |
| 2022/0066456 A1 * | 3/2022 | Ebrahimi Afrouzi | G06F 3/04883 |
| 2022/0088780 A1 * | 3/2022 | Abdul-Hadi | B25J 9/1664 |
| 2022/0110705 A1 * | 4/2022 | Hourtash | A61B 34/30 |
| 2022/0233119 A1 * | 7/2022 | Shelton, IV | A61B 17/07207 |
| 2022/0233253 A1 * | 7/2022 | Shelton, VI | G16H 40/20 |
| 2022/0233267 A1 * | 7/2022 | Shelton, IV | A61B 34/77 |
| 2022/0273396 A1 * | 9/2022 | Bozung | A61B 34/30 |
| 2022/0296320 A1 * | 9/2022 | Griffiths | A61B 34/35 |
| 2022/0304668 A1 * | 9/2022 | Stoy | A61B 17/00234 |
| 2022/0354597 A1 * | 11/2022 | Kaouk | A61B 34/30 |
| 2022/0406452 A1 * | 12/2022 | Shelton, IV | A61B 34/37 |
| 2023/0068121 A1 * | 3/2023 | Lindeman | A61B 34/25 |
| 2024/0208055 A1 * | 6/2024 | Lynch | A61B 34/30 |

FOREIGN PATENT DOCUMENTS

| | | |
|---|---|---|
| WO | WO-2013071071 A1 | 5/2013 |
| WO | WO-2021061105 A1 | 4/2021 |
| WO | WO-2022046787 A1 | 3/2022 |

\* cited by examiner

TECHNIQUES FOR CONSTRAINING MOTION OF A DRIVABLE ASSEMBLY

RELATED APPLICATIONS

This application claims the benefit of U.S. Provisional Application No. 63/476,508, filed Dec. 21, 2022, and entitled "Techniques for Constraining Motion of a Drivable Assembly," which is incorporated by reference herein.

BACKGROUND

Field of the Various Embodiments

The present disclosure relates generally to electronic devices and more particularly to techniques for constraining motion of a drivable assembly.

Description of the Related Art

A computer-assisted system, such as a robotic or other system can be used to perform a task at a worksite. In some example computer-assisted systems, an operator views images of the worksite that are captured by one or more imaging devices of one or more instruments supported by the computer-assisted system. In addition, the operator uses one or more input devices to command motion of the one or more instruments to manipulate or otherwise interact with the worksite. For example, the operator can use the one or more input devices to command an adjustment to the field of view of the one or more imaging devices along one or more degrees of freedom associated with the field of view (e.g., translate forward/backward, left/right, up/down, rotate by pitching, yawing, or rolling, or a combination or subset of the foregoing).

In some instances, a computer-assisted system is a robotic system, and includes a drivable assembly that is coupled to multiple manipulators, such that the drivable assembly is part of the kinematic series of each manipulator of the multiple manipulators. Moving the drivable assembly moves the bases of the multiple manipulators.

Accordingly, improved techniques for operating drivable assemblies in computer-assisted systems are desirable.

SUMMARY

Consistent with some embodiments, a robotic system includes a drivable assembly including a drivable structure, a first manipulator mechanically coupled to the drivable structure, and a second manipulator mechanically coupled to the drivable structure; and a processing system. The processing system is configured to perform operations including receiving a first command. The first command indicates a first commanded motion for a first end effector of a first instrument mechanically coupled to the first manipulator. The first manipulator and the first instrument together comprise a plurality of first links coupled by a plurality of first joints. The operations also include determining a drivable structure limit based on at least one parameter selected from the group consisting of: a type of procedure being performed by the drivable assembly and an operating mode of the drivable assembly. The drivable structure limit defines a limit for motion of the drivable structure. The operations further include determining a first movement for effecting the first commanded motion. The first movement includes a first relative motion of the first end effector relative to the drivable structure and a drivable structure motion of the drivable structure based on the drivable structure limit. The operations additionally include driving the drivable assembly to perform the first movement.

Consistent with some embodiments, a method includes receiving, by a processing system, a first command, the first command indicating a first commanded motion for a first instrument mechanically coupled to a first manipulator of a drivable assembly. The drivable assembly includes a drivable structure, the first manipulator, and a second manipulator. The first manipulator is mechanically coupled to the drivable structure. The second manipulator is mechanically coupled to drivable structure. The first instrument has a first end effector, wherein the first manipulator and the first instrument together comprise a plurality of first links coupled by a plurality of first joints. The method further includes determining, by the processing system, a drivable structure limit based on at least one parameter selected from the group consisting of: a type of procedure being performed by the drivable assembly, a stage of the procedure being performed by the drivable assembly, and an operating mode of the drivable assembly, the drivable structure limit defining a limit for motion of the drivable structure. The method additionally includes determining, by the processing system, a first movement for effecting the first commanded motion, the first movement including a first relative motion of the first end effector relative to the drivable structure, and the first movement further comprising a drivable structure motion of the drivable structure as limited by the drivable structure limit and driving, by the processing system, the drivable assembly to perform the first movement.

Other embodiments include, without limitation, one or more non-transitory machine-readable media including a plurality of machine-readable instructions which, when executed by one or more processors, cause the one or more processors to perform any of the methods disclosed herein.

In some instances, constraining the movements of a drivable assembly of a computer-assisted system such as a robotic system can help avoid collisions, improve the efficiency or effectiveness of tasks performed with the computer-assisted system, improve the ease of use of the computer-assisted system, or the like. For example, constraining the movements of a drivable assembly can help guide or limit the motions of manipulator(s) and/or instrument(s) kinematically coupled with the drivable assembly. This can help avoid sensed or anticipated collisions (e.g., with other portions of the computer-assisted system, with manipulator(s), instrument(s), objects in the worksite, and/or the like). This can also help the drivable assembly stay within range of motion limits of the drivable assembly, manipulator(s), and/or instrument(s), which can help make the computer-assisted system more. Also, the computer-assisted system, the drivable assembly, the manipulators, and/or the instruments may be subject to additional constraints to their motions, which can guide, limit, or interfere with the ability to perform a commanded motion.

The foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
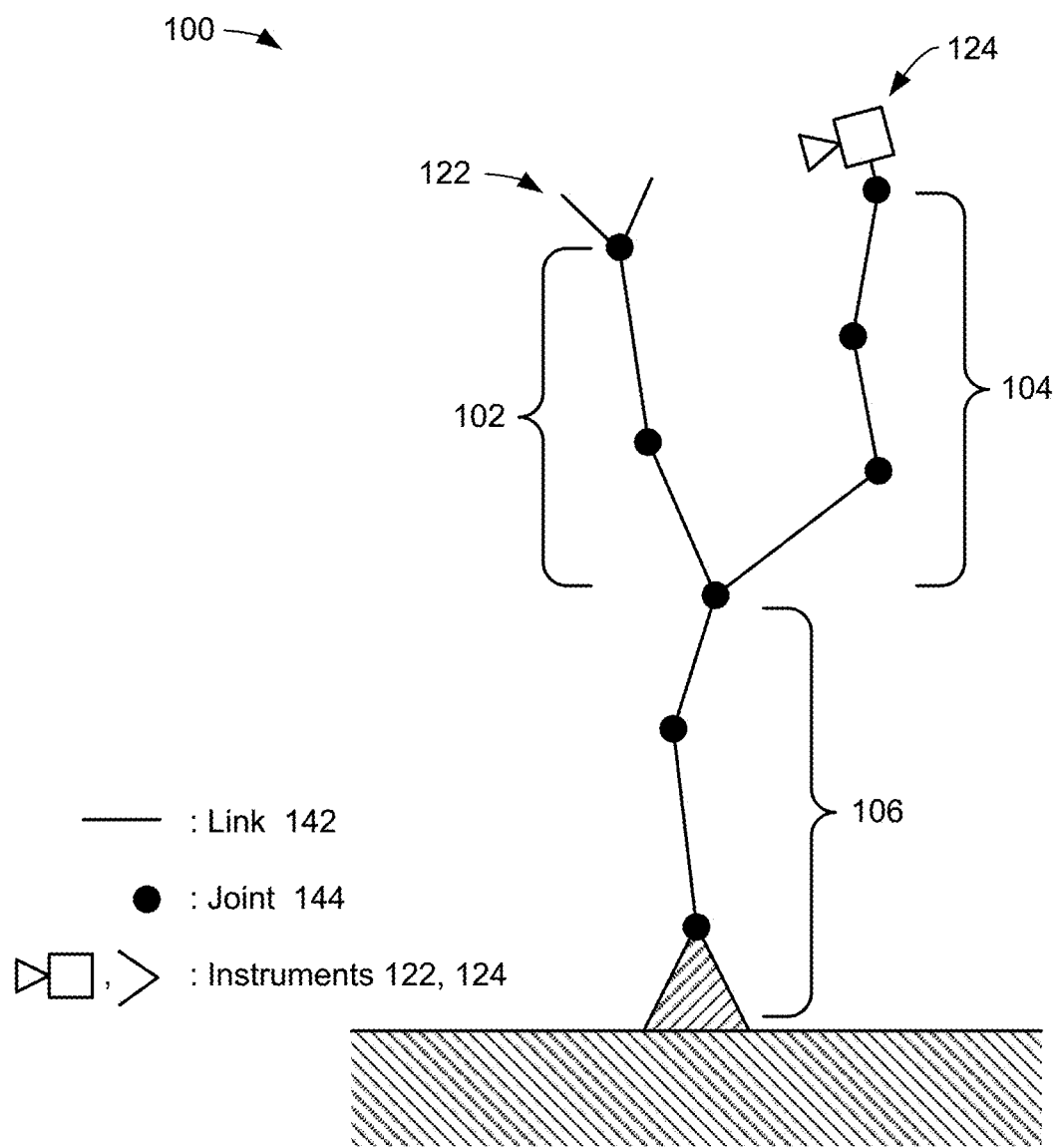
FIG. 1 illustrates an example drivable assembly comprising a drivable structure, according to various embodiments.

This description and the accompanying drawings that illustrate inventive aspects, embodiments, embodiments, or modules should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail in order not to obscure the invention. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Further, the terminology in this description is not intended to limit the invention. For example, spatially relative terms-such as "beneath", "below", "lower", "above", "upper", "proximal", "distal", and the like-may be used to describe one element's or feature's relationship to another element or feature as illustrated in the figures. These spatially relative terms are intended to encompass different positions (i.e., locations) and orientations (i.e., rotational placements) of the elements or their operation in addition to the position and orientation shown in the figures. For example, if the content of one of the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. Likewise, descriptions of movement along and around various axes include various special element positions and orientations. In addition, the singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

Elements described in detail with reference to one embodiment, embodiment, or module may, whenever practical, be included in other embodiments, embodiments, or modules in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, embodiment, or application may be incorporated into other embodiments, embodiments, or aspects unless specifically described otherwise, unless the one or more elements would make an embodiment or embodiment non-functional, or unless two or more of the elements provide conflicting functions.

In some instances, well known methods, procedures, components, and circuits have not been described in detail so as not to unnecessarily obscure aspects of the embodiments.

This disclosure describes various elements (such as systems and devices, and portions of systems and devices) with examples in three-dimensional space. In such examples, the term "position" refers to the location of an element or a portion of an element in a three-dimensional space (e.g., three degrees of translational freedom along Cartesian x-, y-, and z-coordinates). Also in such examples, the term "orientation" refers to the rotational placement of an element or a portion of an element (three degrees of rotational freedom—e.g., roll, pitch, and yaw). Other examples may encompass other dimensional spaces, such as two-dimensional spaces. As used herein, the term "pose" refers to the position, the orientation, or the position and the orientation combined, of an element or a portion of an element. As used herein, and for an element or portion of an element of a structure or assembly (e.g., of a computer-assisted system or a repositionable structure, etc.), the term "proximal" in a kinematic series refers to a direction toward the base of the kinematic series, and the term "distal" refers to a direction away from the base along the kinematic series.

Aspects of this disclosure are described in reference to electronic systems, computer-assisted devices, and robotic devices, which may include systems and devices that are teleoperated, remote-controlled, autonomous, semiautonomous, manually manipulated, and/or the like. Example computer-assisted systems include those that comprise robots or robotic devices. Further, aspects of this disclosure are described in terms of an embodiment using a medical system, such as the da Vinci® Surgical System commercialized by Intuitive Surgical, Inc. of Sunnyvale, California. Knowledgeable persons will understand, however, that inventive aspects disclosed herein may be embodied and implemented in various ways, including robotic and, if applicable, non-robotic embodiments. Embodiments described for da Vinci® Surgical Systems are merely exemplary, and are not to be considered as limiting the scope of the inventive aspects disclosed herein. For example, techniques described with reference to surgical instruments and surgical methods may be used in other contexts. Thus, the instruments, systems, and methods described herein may be used for humans, animals, portions of human or animal anatomy, industrial systems, general robotic, or teleoperational systems. As further examples, the instruments, systems, and methods described herein may be used for non-medical purposes including industrial uses, general robotic uses, sensing or manipulating non-tissue work pieces, cosmetic improvements, imaging of human or animal anatomy, gathering data from human or animal anatomy, setting up or taking down systems, training medical or non-medical personnel, and/or the like. Additional example applications include use for procedures on tissue removed from human or animal anatomies (with or without return to a human or animal anatomy) and for procedures on human or animal cadavers. Further, these techniques can also be used for medical treatment or diagnosis procedures that include, or do not include, surgical aspects.

System Overview

FIG. 1 illustrates an example drivable assembly 100 of a computer-assisted system such as a robotic system. The drivable assembly 100 comprises a drivable structure 106 and multiple manipulators physically coupled to the drivable structure, according to various embodiments. As shown in FIG. 1, a drivable assembly 100 includes, without limitation, a drivable structure 106 that physically supports a first manipulator 102 and a second manipulator 104. The first manipulator 102 is configured to support a first instrument 122, and the second manipulator 104 is configured to support a second instrument 124. In various embodiments, each of the drivable structure 160, the first and second manipulators 102, 104, and the first and second instruments 122, 124 can include any number of joints 144 of any type, and any number of links 142 of any geometry. While FIG. 1 shows a drivable structure 106 supporting two manipulators 102 and 104 configured to support instruments 122 and 124, respectively, the drivable structure 106 can support any number of drivable structures, and the first and second manipulators 102, 104 can each support any number of instruments.

In the embodiments shown in FIG. 1, the combination of the first instrument 122 and the first manipulator 102 has fewer joints than the combination of the second instrument 124 and the second manipulator 104. In one example, described in detail below, with reference to various figures, the second instrument 124 supported by the second manipulator 104 includes shaft offset joints to enable a translational offset along the shaft of the second instrument 124, and the first instrument 122 on the first manipulator 102 does not include shaft offset joints. Thus, the end effector of the second instrument 124 may have more degrees of freedom or a larger range of motion than the end effector of the first instrument 122. To facilitate increased workspace of the first instrument 122, the first instrument 122 can be moved by movement of the drivable structure 106. However, movement of the drivable structure 106 would also result in caused motion of the second manipulator 104 and the second instrument 124.

In some embodiments, the motion of each of the drivable structure 106, first manipulator 102, first instrument 122 with jawed end effectors (not labeled), second manipulator 104, and second instrument 124 with an imaging device (not labeled) is relative to a corresponding reference. The corresponding references can be the same reference, or be different references. A reference can be, for example and without limitation, a reference point, a reference line or other geometric feature, a reference frame, etc. The reference can be fixed to the environment (e.g., a point, geometric feature, or frame of reference fixed to the environment or the earth; such a reference frame can be called a "world frame"), to a subject of a procedure such as a workpiece or part of a patient (e.g., a point, geometric feature, or frame of reference fixed to a patient feature and/or the like; such a reference frame can be called a "subject frame,"), to a base of the robotic system (e.g., a base point, a base plane, frame of reference of the drivable assembly or some other part of the robotic system), and/or the like. In some embodiments, the motions of the drivable structure 106, first manipulator 102, first instrument 122, second manipulator 104, and/or second instrument 124 are determined, controlled, or sensed relative to a same reference, or to different references. For example, the motion of the drivable structure 106 could be relative to a world frame while the motion of the first manipulator 102 and first instrument 122 could be relative to a reference point or reference frame fixed to the drivable structure 106. In the example shown in FIG. 1, the bases of first manipulator 102 and second manipulator 104 are attached to a distal portion of the drivable structure 106, and motion of the drivable structure 106 moves the bases of first manipulator 102 and second manipulator 104. This "caused motion" of the bases of first manipulator 102 and second manipulator 104 can move distal portions of first manipulator 102 and/or second manipulator 104, and of any instruments or other elements attached to first manipulator 102 and second manipulator 104. In some embodiments, a caused motion (e.g., of the first manipulator 102 and first instrument 122 or of the second manipulator 104 and second instrument 124) is determined, responded to, or sensed relative to the same or a different reference as used for the motion of the drivable structure 106.

In one or more embodiments, compensatory movements are determined by a processing system and performed by the second manipulator 104 and/or the second instrument 124 to partially or entirely cancel the motion of the end effector of the second instrument 124 that would otherwise result due to the movement of the drivable structure 106. In some embodiments, one or more additional drivable structures configured to support instruments are also mechanically coupled to, and distally located from, the drivable structure 106. Additional compensatory motions for these additional drivable structures (and any additional instruments supported by such additional drivable structures) are also determined by the processing system and performed by these additional drivable structures. Robotic systems supporting those and other additional features, and methods enabling these features are discussed further in the following description. While FIG. 1 schematically shows a drivable assembly in general terms, more specific examples are described in further detail below with reference to FIGS. 2A, 2B, and 3.

Figure 2A:
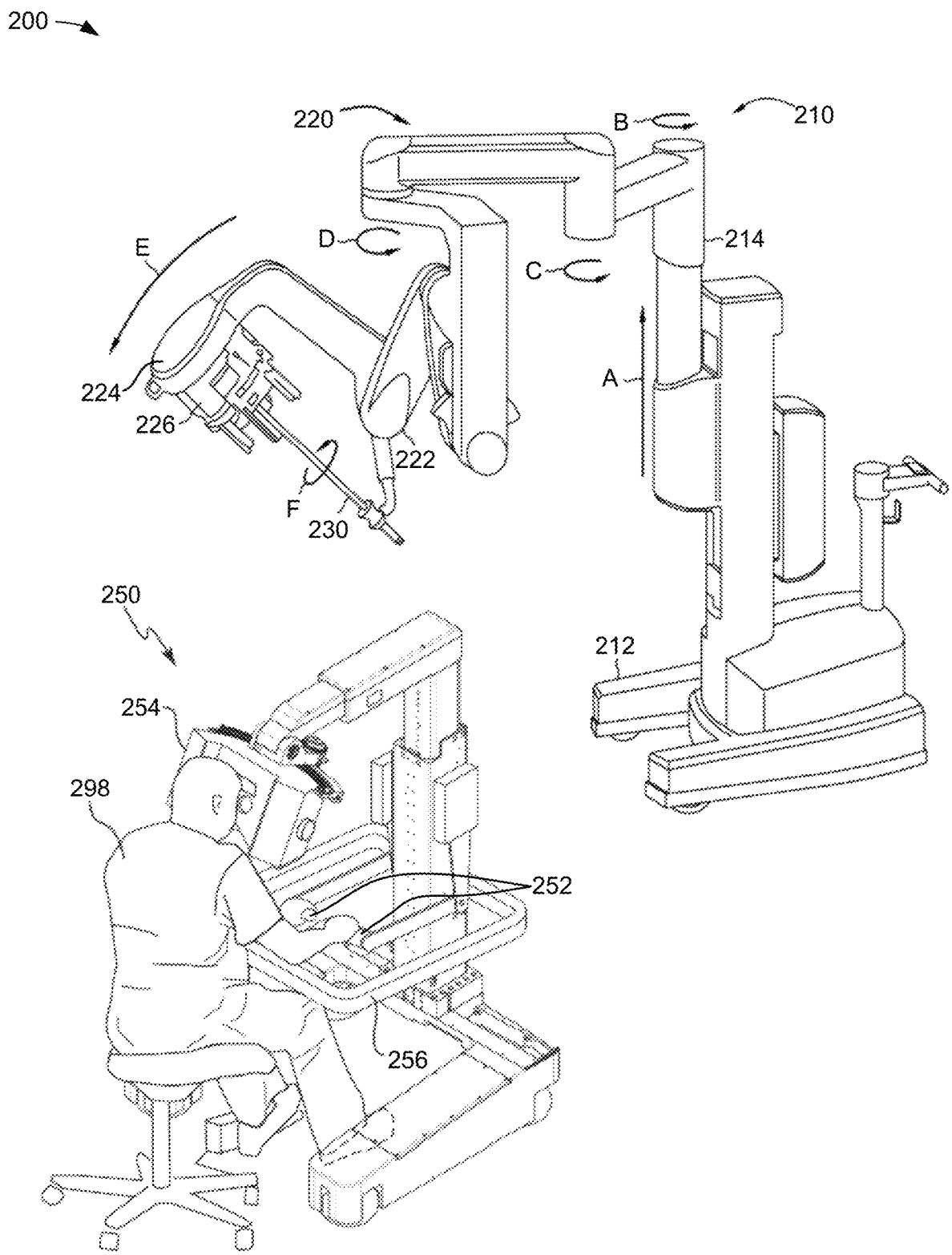
FIG. 2A illustrates an example robotic system, according to various embodiments.

FIG. 2A illustrates an example computer-assisted system comprising a robotic system 200, according to various embodiments. As shown in FIG. 2A, the robotic system 200 includes, without limitation, a drivable assembly 210 and a user input system 250. In a teleoperation scenario, an operator 298 uses the user input system 250 to operate the drivable assembly 210, such as in a leader-follower configuration (also often called teleoperation configuration or master-slave configuration in industry) of the robotic system 200. In the leader-follower configuration, the user input system 250 is the leader, and the drivable assembly 210 is the follower of the leader-follower configuration.

The drivable assembly 210 can be used to introduce a set of instruments (not shown here, discussed below with reference to FIGS. 3A and 3B to a work site through a single port 230 (a cannula is shown) inserted in an aperture. In a medical scenario, the work site can be on or within a body cavity of a patient, and the aperture can be a minimally invasive incision or a natural body orifice. In some embodiments, the port 230 is a structure held by a drivable structure 222 at a manipulator-supporting link 224 of the drivable structure 222. The drivable structure 222 is coupled to additional joints and links 214, 220 of the drivable assembly, and these additional joints and links 214, 220 are mounted on a base 212. In some embodiments, the drivable structure 222 terminates in a manipulator-supporting link 224. A set of manipulators 226 are coupled to the manipulator-supporting link 224. Each of the manipulators 226 include a carriage (or other instrument-coupling link) configured to couple to an instrument, and each of the manipulators 226 include one or more joint(s) that can be driven to move the carriage. For example, a manipulator 226 can include a prismatic joint that, when driven, linearly moves the carriage and any instrument(s) coupled to the carriage. In some embodiments, this linear motion is along an insertion axis, as further described below with reference to FIGS. 4A and 4B.

In some embodiments, the additional joints and additional links 214 and 220 are used to position the port 230 at the aperture or another location. FIG. 2A illustrates a prismatic joint for vertical adjustment (as indicated by arrow "A") and a set of rotary joints for horizontal adjustment (as indicated by arrows "B" and "C"). The drivable structure 222 is used to robotically pivot the port 230 (and the instruments disposed within it at the time) in yaw, pitch and roll angular rotations about the remote center of motion as indicated by arrows D, E and F, respectively.

In some embodiments, actuation of the degrees of freedom provided by joint(s) of the instrument(s) is provided by actuators disposed in, or whose motive force (e.g., linear force or rotary torque) is transmitted to, the instrument(s). Examples of actuators include rotary motors, linear motors, solenoids, and/or the like. The actuators drive transmission elements in the manipulators and/or in the instruments to control the degrees of freedom of the instrument(s). For example, the actuators can drive rotary discs of the manipulator that couple with rotary discs of the instrument(s), where driving the rotary discs of the instruments drives transmission elements in the instrument that couple to move the joint(s) of the instrument, or to move the end effector(s) of the instrument, as further discussed below with reference to FIGS. 3A and 3B. Accordingly, the degrees of freedom of the instrument(s) are controlled by actuators that drive the instrument(s) in accordance with control signals determined based on inputs from the associated input devices (e.g., input devices 252 of the user input system 250). The control signals are determined in order to cause instrument motion or other actuation as indicated by movement of the input control devices or any other control signal. Furthermore, in some embodiments, appropriately positioned sensors, e.g., encoders, potentiometers, and/or the like, are provided to enable measurement of indications of the joint positions, or other data that can be used to derive joint position, such as joint velocity. The actuators and sensors are disposed in, transmit to, and/or receive signals from the manipulator(s) 226.

While a particular configuration of the drivable assembly 210 is shown in FIG. 2A, those skilled in the art will appreciate that embodiments of the disclosure can be used with any design of drivable assembly. For example, a drivable assembly can have any number and any types of degrees of freedom, may or may not be configured to couple to a port, use a port other than a cannula, and/or other configuration different from what is shown in FIG. 2A.

In the embodiments shown in FIG. 2A, the user input system 250 includes one or more input devices 252 operated by the operator 298. The one or more input devices 252 are contacted and manipulated by the hands of the operator 298, with one input device for each hand. Examples of such hand-input-devices include any type of device manually operable by human user, e.g., joysticks, trackballs, button clusters, and/or other types of haptic devices typically equipped with multiple degrees of freedom. Additionally, in some embodiments, position, force, and/or tactile feedback devices (not shown) are employed to transmit position, force, and/or tactile sensations from the instruments back to the operator's hands through the input devices 252.

The input devices 252 are supported by the user input system 250 and are shown as mechanically grounded, and in other implementations may be mechanically ungrounded. An ergonomic support 256 is provided in some implementations. For example, FIG. 2A shows an ergonomic support 256 including forearm rests on which the operator 298 may rest his or her forearms while manipulating the input devices 252. In some examples, the operator 298 performs tasks at a work site near the drivable assembly 210 during a medical procedure by controlling the drivable assembly 210 using the input devices 252.

A display unit 254 is included in the user input system 250. The display unit 254 displays images for viewing by the operator 298. The display unit 254 provides the operator 298 with a view of the worksite with which the drivable assembly 210 interacts. The view can include, for example, stereoscopic images or three-dimensional images to provide a depth perception of the worksite and the instrument(s) of the drivable assembly 210 in the worksite. The display unit 254 can be moved in various degrees of freedom to accommodate the operator's viewing position and/or to provide control functions. Where a display unit (such as the display unit 254 is also used to provide control functions, such as to command the drivable assembly, the display unit also includes an input device (e.g., another input device 252).

When using the user input system 250, the operator 298 can sit in a chair or other support in front of the user input system 250, position his or her eyes to see images displayed by the display unit 254, grasp and manipulate the input devices 252, and rest his or her forearms on the ergonomic support 256 as desired. In some implementations, the operator 298 can stand at the workstation or assume other poses, and the display unit 254 and input devices 252 may differ in construction, be adjusted in position (height, depth, etc.), etc.

Figure 2B:
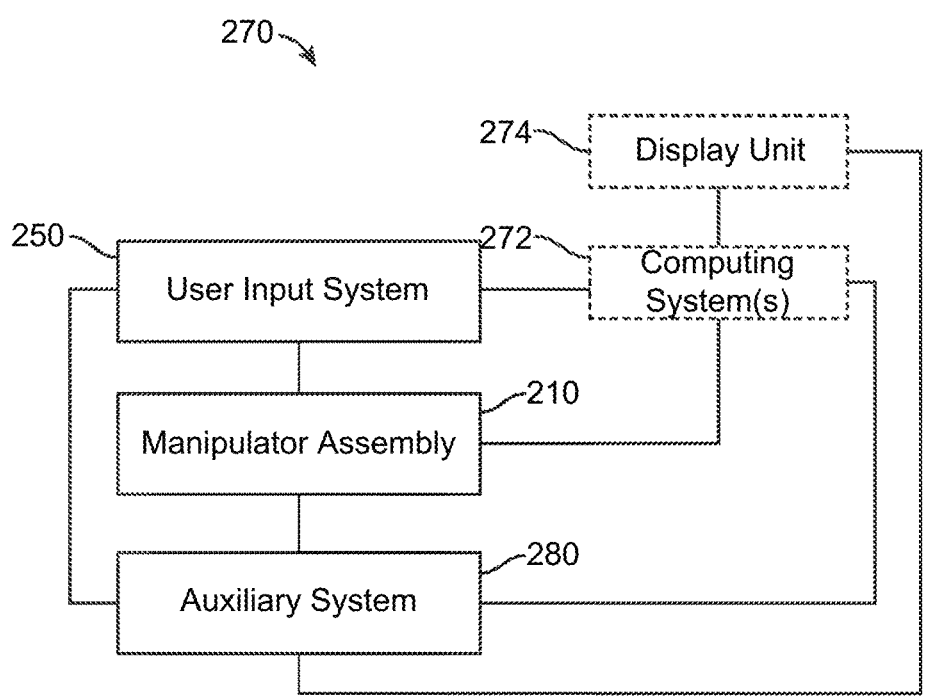
FIG. 2B illustrates an example system, according to various embodiments.

FIG. 2B illustrates an example system 270, according to various embodiments. The system 270 corresponds to the robotic system 200 and includes one or more computing systems 272. A computing system 272 includes a processing system and is used to process input provided by the user input system 250, e.g., from the input device(s) 252 manipulated by an operator. In some embodiments, a computing system 272 is further used to provide an output, e.g., a video image to the display unit 274. Examples of display unit 274 include LCDs, LEDs, organic LED displays, projectors, etc. In some embodiments, one or more computing systems 272 are used to control the drivable assembly 210.

In one or more embodiments, the computing system(s) 272 executes one or more control methods. The control methods include instructions for controlling one or more components of the drivable assembly 210. In one or more embodiments, joint movements of the drivable assembly 210 are controlled by one or more control methods driving one or more joints using actuators of the drivable assembly 210, the joint movements being calculated by a processor of a processing system of the computing system(s) 272. The control methods process control signals from the user input system 250 or elsewhere, and/or sensor signals (e.g., positional encoder data from joint position sensors, image data from image instruments such as ultrasonic probes or cameras or endoscopes, and/or the like), to calculate commands for the joint actuators.

In some embodiments, the control methods perform at least some of the calculations of the joint commands using vectors and/or matrices, some of which have elements corresponding to positions, velocities, and/or forces/torques of the joints. The range of alternative joint configurations available to the control methods can be conceptualized as a joint space. For example, in some embodiments, the joint space has as many dimensions as the drivable assembly has degrees of freedom, and a particular configuration of the drivable assembly represents a particular point in the joint space, with each coordinate corresponding to a joint state of an associated joint of the drivable assembly.

As used herein, the term "state" of a joint or multiple joints refers to the control variables associated with the joint or the multiple joints, respectively. For example, the state of an angular joint refers to the angle defined by that joint within its range of motion, and/or to the angular velocity (or speed or direction) of the joint. Similarly, the state of an axial or prismatic joint refers to the joint's axial or linear position, and/or to its axial or linear velocity (or speed or direction). While one or more of the control methods described herein include position controllers, they often also have velocity control aspects. Alternative embodiments can rely primarily or entirely on velocity controllers, force controllers, acceleration controllers, and/or the like without departing from the disclosure. Various aspects of control systems that can be used in such devices are described in U.S. Pat. No. 6,699,177, which is incorporated herein by reference. In general, as long as the movements described are based on the associated calculations, the calculations of movements of the joints and movements of an end effector described herein are performed using a position control technique, a velocity control technique, an acceleration control technique, a force or torque control technique, a combination of some or all of the foregoing, and/or the like.

In some embodiments, the control modes include one or more other types of control modes. For example, during a robotic task being performed under the control of input devices 252 operated by a user, various joints of the drivable assembly can be commanded to a same position and controlled to maintain static positions. However, in another control mode, one or more of the joints can be commanded to be "floating", and facilitate motion of that joint due to externally applied force. For example, a joint held in place by a brake can be floated by partially or entirely releasing the brake. An example of such a joint includes a passive joint held in place by an electromagnetic brake. As another example, a joint driven by actuator(s) can be held in place by commanding the actuator(s) to hold the joint position, and be floating by updating the command to the actuator(s) to the then-current position, velocity, and/or acceleration of the joint. As a result, a floating joint is readily reconfigured by an externally applied force or torque, without a control algorithm and/or a braking force seeking to counteract the reconfiguration caused by sufficient externally applied force or torque. In some embodiments, a floating joint is further controlled to exhibit other characteristics or provide additional responses, such as to provide a certain type or level of damping response. A floating joint can still be braked, actuated, or otherwise managed for friction or gravity compensation. Such compensation can be provided by, for example and without limitation, passive springs, actively driven actuators, and/or the like. Further, in some embodiments, joints that are not moved by actuators can still be gravity compensated, friction compensated, dampened, and/or the like by actuators.

In various embodiments, multiple different control modes are combined during operation of the drivable assembly. For example, some joints could be controlled to maintain position and resist or rebound from attempted external articulation of those joints, while other joints could be controlled to be floating and facilitate external articulation of those other joints. Parameters such as joint position, velocity, or acceleration of the joints are detected by joint sensors. The sensor signals are used to provide kinematic information of the drivable assembly.

The architecture of the control methods used for controlling the drivable assembly can be of any appropriate form. As a specific example, the control architecture can be hierarchical, and could include a high-level controller and multiple joint controllers. A commanded movement is received by the high-level controller in, for example, a Cartesian-coordinate space (referred to herein as Cartesian-space). The commanded movement could be, for example, based on a movement command (e.g., in the form of a position and/or velocity) received from the user input system 250, or any other system that provides a movement command. The commanded movement is converted into commanded joint positions or joint velocities (e.g., linear or angular joint positions, linear or angular joint velocities). In some embodiments, the conversion is performed using an inverse kinematics algorithm. Subsequently, the joint controllers convert the received commanded joint positions or velocities into commanded currents to drive the actuators producing joint movements. The joint movements together produce a drivable assembly movement that reflects the commanded movement.

In some embodiments, a joint controller controls a joint position. In some embodiments, the joint controller controls other variables such as joint velocity and/or joint force (linear force or angular torque). A joint controller receives a feedback signal in the form of a sensed joint state from an associated joint sensor, which it can use for closed-loop control. The sensed joint state includes, for example and without limitation, a joint position, a joint velocity (or component of velocity such as speed or direction), a joint acceleration (or component of acceleration), and/or the like, representing the joint movement. The sensed joint state is derived from the signals obtained from the joint sensor. A joint sensor can be, for example, an encoder, a potentiometer, an accelerometer, a hall effect sensor, and/or the like. In some embodiments, a state observer or estimator (not shown) is used. Each joint controller can implement any appropriate control scheme, such as a proportional integral derivative (PID), proportional derivative (PD), full state feedback, sliding mode, and/or various other control schemes, without departing from the disclosure.

In one or more embodiments, the control methods further perform at least one of the steps described in FIGS. 6 and 7 below. These methods are used to drive one or more of the actuators of the drivable assembly 210.

A computing system 272 includes, without limitation, one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. In some embodiments, a computer processor of a computing system 272 is an integrated circuit for processing instructions. For example, the computer processor can be one or more cores or micro-cores of a processor.

In some embodiments, a communication interface of a computing system 272 includes an integrated circuit for connecting the computing system 272 to a network (not shown) and/or to another device, such as another computing system 272. Further, in some embodiments, the computing system 272 includes one or more output devices, such as a display unit 274, a printer, a speaker, external storage, or any other output device. Software instructions in the form of computer readable program code to perform embodiments of the disclosure are stored, in whole or in part, temporarily or permanently, on non-transitory computer readable medium. Specifically, the software instructions correspond to computer readable program code that, when executed by a processor(s), is configured to perform one or more embodiments of the invention. In some embodiments, a computing system 272 is connected to or be a part of a network. The network may include multiple nodes. Each node corresponds to a different computing system, group of computing systems, group of nodes, and/or the like.

In some embodiments, the drivable assembly 210 couples to an instrument when used to perform a procedure. The instrument can include an imaging device, e.g., an endoscope or an ultrasonic probe, usable to capture images of the worksite and output the captured images to an auxiliary system 280. In some embodiments, the auxiliary system 280 processes the captured images using one or more image processing techniques prior to any subsequent display. For example, the auxiliary system 280 can overlay the captured images with a virtual control interface prior to displaying the combined images to the operator via the user input system 250. In some embodiments, one or more separate display units 274 are coupled with a computing system 272 and/or the auxiliary system 280 for local and/or remote display of images, such as images of the procedure site or other related images.

Figure 3:
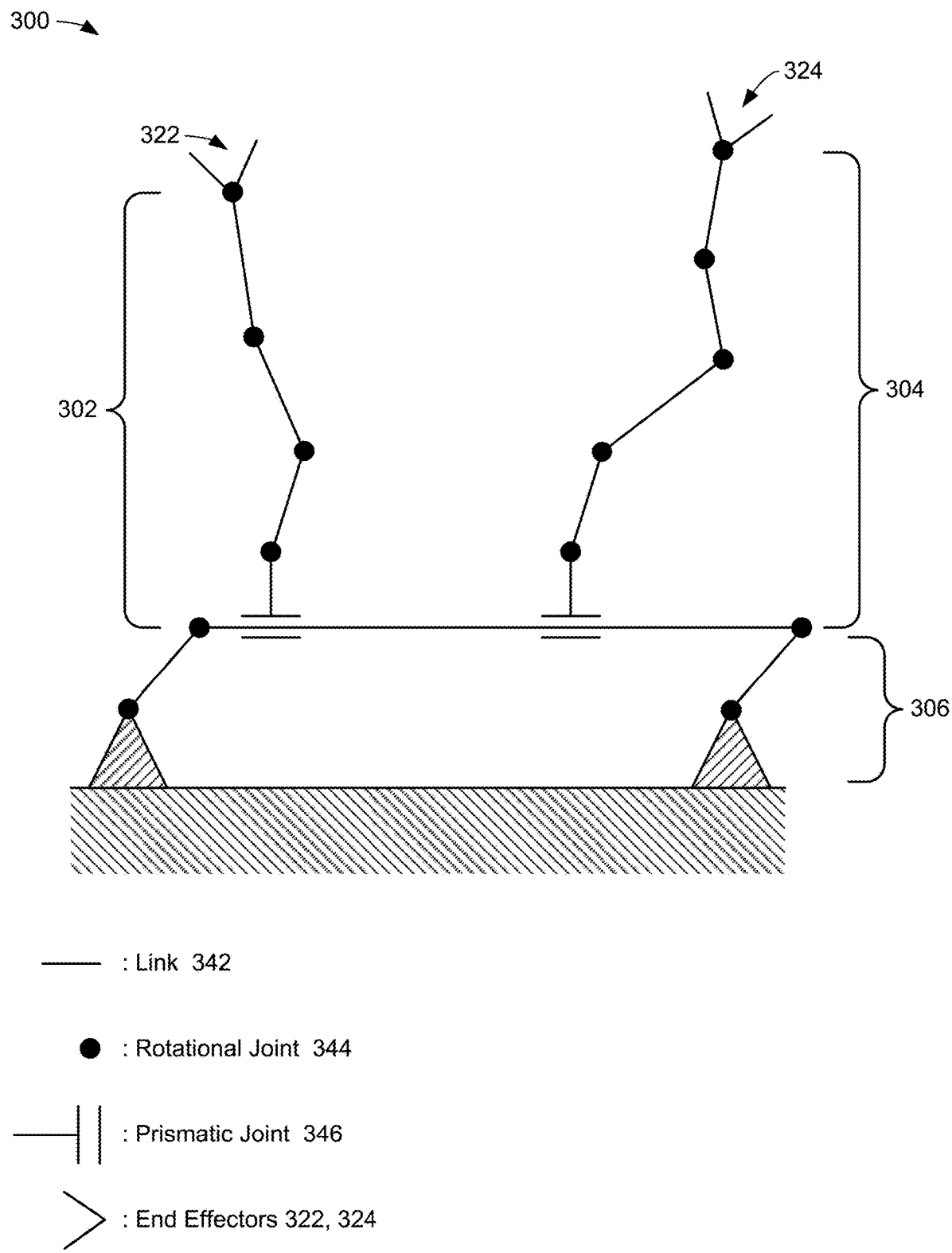
FIG. 3 illustrates an example drivable assembly comprising a drivable structure, according to various other embodiments.

FIG. 3 illustrates another example drivable assembly 300 of a computer-assisted system such as a robotic system, according to various embodiments. As shown in FIG. 3, drivable assembly 300 includes, without limitation, a drivable structure 306, physically supporting a first manipulator 302 and a second manipulator 304. The first manipulator 302 supports a first instrument 322, and the second manipulator 304 supports a second instrument 324. Each of the first manipulator 302, second manipulator 304, and drivable structure 306, the first instrument 322, and second instrument 324 includes any number of joints (e.g., joints 344 and 346) of any type and/or any number of links (e.g., links 342) of any geometry. As shown in FIG. 3, the drivable structure 306 provides a movable support for the first manipulator 302 and second manipulator 304. Prismatic joints 346 enable translational movement of the first manipulator 302 and the second manipulator 304 relative to the drivable structure 306. While two manipulators (the first manipulator 302 and the second manipulator 304) are shown in FIG. 3, any number of manipulators can be supported by the drivable structure 306.

In some embodiments, the drivable assembly 300 is part of a medical robotic system. For example, the drivable assembly 300 can be configured as a tableside-installed medical robotic system. The drivable structure 306 could be attached to a base of a surgical or examination table. Further, the medical robotic system could include one or more additional drivable structure assemblies with the same or a different design. For example, the drivable assembly 300 can be installed on one side of the table, and a same or different drivable assembly can be installed on the same side, or another side, of the table.

Figure 4A:
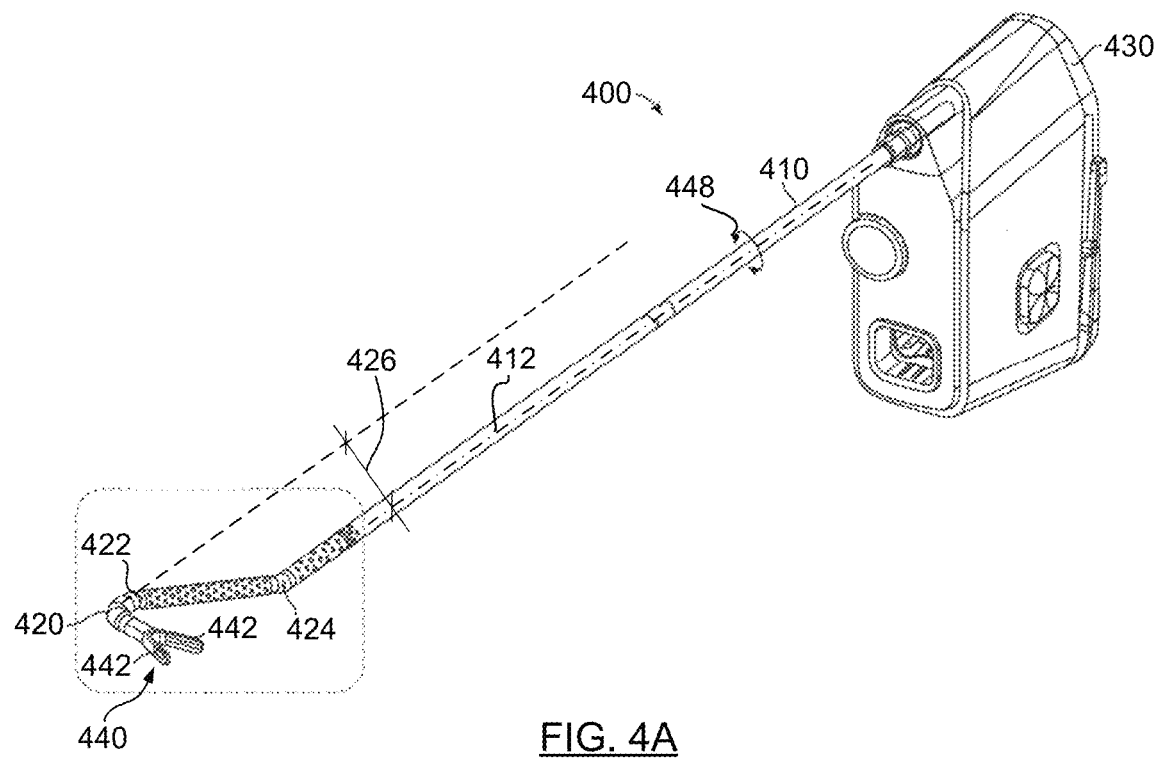
FIG. 4A illustrates an example instrument, according to various embodiments.

FIG. 4A illustrates an example instrument 400 (also referred to herein as an instrument 400), according to various embodiments. The instrument 400 in FIG. 4A includes, without limitation, a shaft 410, and an end effector located at a first end of the instrument 400. A housing 430, arranged to releasably couple the instrument 400 to a manipulator (shown, for example, in FIG. 2A), is located at a second end of the instrument 400. In some embodiments, the shaft 410 is rotatably coupled to the housing 430 to enable angular displacement of the shaft 410 relative to the housing 430, as indicated by arrows 448.

Various types of end effectors 440 can be used. For example, the end effector 440 can include one finger, two fingers (e.g., jaws 442 that may open and close), or three or more fingers. Examples of end effectors include, but are not limited to, scissors, forceps, staplers, cutting instruments, and/or the like. As another example, an end effector can further include an imaging device, e.g., an endoscope or an ultrasonic probe, to capture images of the worksite.

In some embodiments, an end effector 440 is actuated by transmission elements (e.g., cables, metal bands, screws, tubes, push rods, etc.) that connect parts of the instrument to drive elements (e.g., pulleys, capstans, spools, nuts, linear slides, or the like) (not shown) in the housing 430. Movement (e.g., translation or rotation) of the drive elements thereby controls the position of the end effector, or other degrees of freedom such as jaw opening, such that the end effector may translate or rotate, the jaws may open and close, and/or the like. In some embodiments, upon coupling of an instrument 400 on a manipulator, the drive elements engage with actuators of the manipulator, such as by engaging with transmission elements coupled to the actuators. As an example, a description of the control of an instrument like the instrument 400 can be found in U.S. Pat. No. 6,394,998, entitled "Surgical Tools for Use in Minimally Invasive Telesurgical Applications," f which is incorporated herein by reference.

In the example shown in FIG. 4A, the joints of the instrument 400 include, without limitation, a wrist 420 proximal to the end effector 440 and two shaft offset joints 422, 424 proximal to the wrist 420. The wrist 420 may enable rotation of the end effector 440 in one or more direction. The shaft offset joints 422, 424 can enable, for example, a translational offset 426 of the end effector 440 relative to the insertion axis 412, in addition to the rotating provided by the wrist 420. The shaft offset joints 422, 424 may, thus, increase the workspace reachable by the end effector 440 of the instrument 400. Like the end effector 440, the wrist 420 and the shaft offset joints 422, 424 may be actuated by control cables.

Figure 4B:
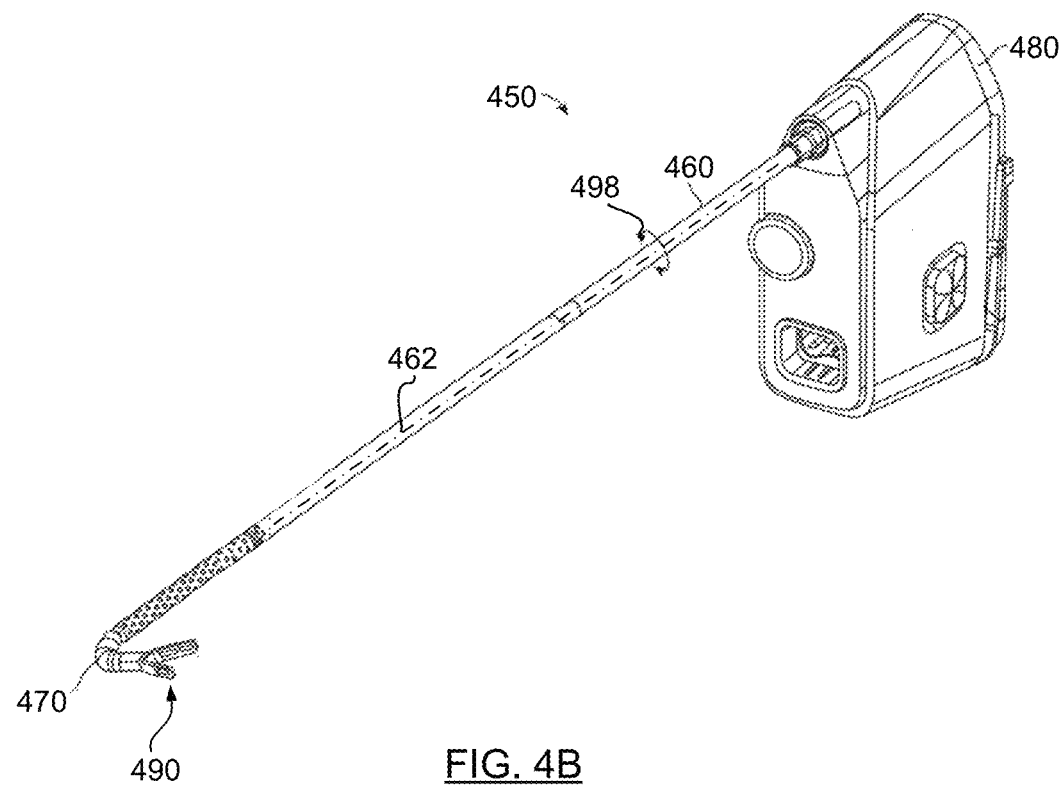
FIG. 4B illustrates an example instrument, according to various other embodiments.

FIG. 4B illustrates an example instrument or instrument 450, according to various other embodiments. Instruments 400 and 450 can be used for robotic procedures such as robotic medical procedures (e.g., surgeries), in accordance with one or more embodiments.

The instrument 450 shown in FIG. 4B includes, without limitation, various elements of the instrument 400 shown in FIG. 4A and operates in a substantially similar manner to the instrument 400 shown in FIG. 4A. Specifically, the instrument 450 includes a shaft 460 and a wrist 470 proximal to an end effector 490. Further, the instrument 450 has an insertion axis 462 for insertion/retraction of the instrument 450. The instrument 450 also allows angular displacement of the shaft 460 relative to the housing 480 as indicated by the arrows 498. Unlike the instrument 400 in FIG. 4A, the instrument 450 is not equipped with shaft offset joints. Accordingly, the instrument 450 cannot achieve a translational offset of the end effector 440 relative to the insertion axis 462 as can the instrument 400. For example, the shaft 460 without shaft offset joints could be made more rigid, could be configured to allow the transmission of higher forces or torques, could be configured to transmit forces and torques with reduced friction, and/or the like, compared to a similar shaft that includes shaft offset joints (e.g., shaft 410). An example of an instrument that generally utilizes transmission of a higher forces compared to other instruments is a tissue stapler. Additionally, in various implementations, an instrument without shaft offset joints could be less costly, easier to service, maintain and/or clean than a comparable instrument with shaft offset joints.

While FIGS. 4A and 4B show particular configurations of instruments, designed to engage with a particular type of manipulator, other configurations of instruments are within the scope of the disclosure. For example, embodiments of instruments 400 and 450 could have multi-degree-of-freedom wrists (e.g., pitch and yaw degrees of freedom), single-degree-of-freedom wrists (e.g., pitch or jaw), or no wrists. Also, various embodiments of instruments could have any suitable type of end effector including, for example, scissors, forceps, staplers, irrigation nozzles, hooks, scissors, blunt dissection instruments, needle drivers, imaging devices, and/or the like. Further, different housings can also be used to interface with different types of manipulators.

As explained in further detail below with respect to FIGS. 5A-6, if a commanded movement includes rotation of the instrument about the roll axis, then the rotation could be effected partially or entirely by motion of a manipulator supporting the instrument, by a drivable structure supporting the manipulator, by coordinated motion of both the manipulator and the drivable structure, and/or the like. For example, the rotation of the instrument could be assisted by motion of a drivable structure kinematically proximate to the instrument. If the roll axis of the drivable structure is collinear with, parallel to, or has a component parallel to, the roll axis of the instrument, then rotating the drivable structure can be used to partially or entirely effect the rotation of the instrument about the roll axis of the instrument. If the roll axis of the drivable structure is not collinear or parallel with the roll axis of the instrument, then rotating the drivable structure can cause non-roll ("additional") motion of the instrument along other axes of the instrument (e.g., pitch and yaw) in addition to rotation of the instrument about the roll axis. In such cases, rotation of the drivable structure can be limited using the techniques described below in order to reduce the pitch and/or yaw motion of the instrument introduced while effecting the roll motion of the instrument.

In one example, an instrument could be an imaging device that does not include an independent degree of freedom for rotating about a roll axis, such as an imaging device with 0 degree orientation relative to a shaft used to insert the imaging device into a workspace, an imaging device with an angled (e.g., 30 degree) orientation relative to the shaft, an imaging device having one or more other degrees of freedom not including a roll degree of freedom (e.g., pitch, yaw, and/or insertion/retraction degrees of freedom), an imaging device that has an articulated wrist or one or more joints to provide one or more other degrees of freedom, and/or the like. Such an imaging device could be, for example and without limitation, an endoscope, stereoscopic endoscope, camera, stereoscopic camera, and/or the like.

Figure 5B:
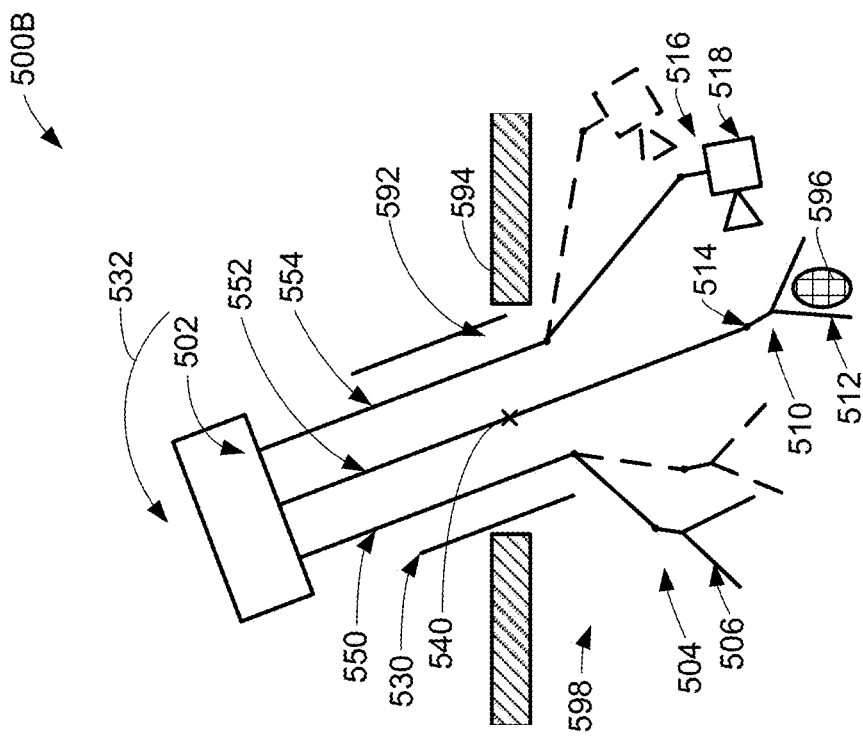
FIGS. 5A and 5B illustrate repositioning of an end effector of an instrument using a movement of a drivable structure proximal to the instrument and other instruments, according to various embodiments.
Figure 5A:
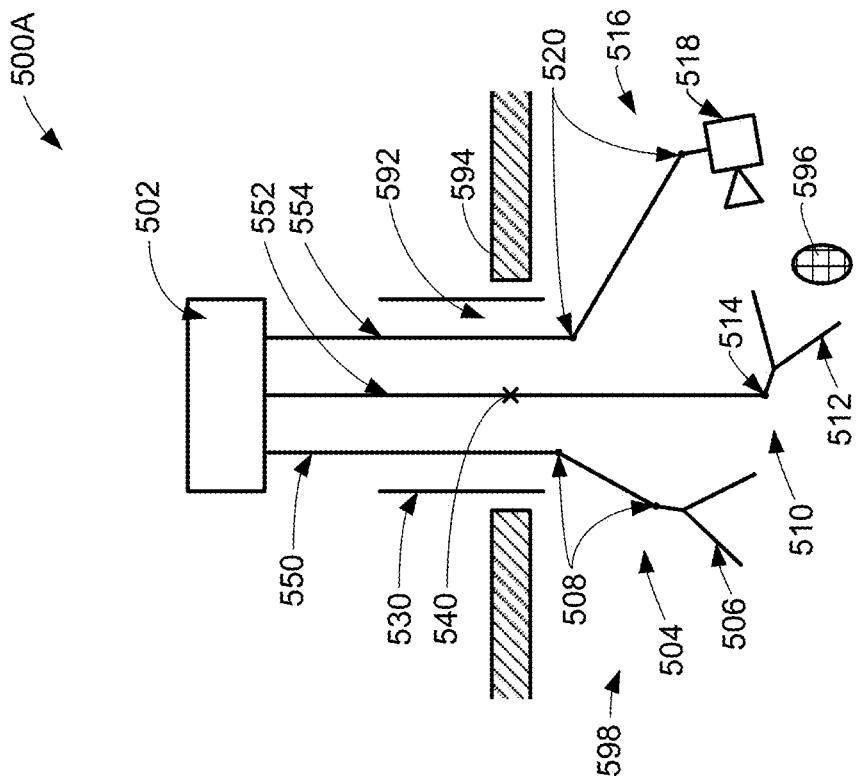

FIGS. 5A and 5B illustrate repositioning of an instrument 510 using a movement of a drivable structure proximal to the instrument and other instruments, according to various embodiments. FIG. 5A illustrates a scenario 500A before the repositioning, and FIG. 5B shows a scenario 500B after the repositioning. In the scenario illustrated by FIGS. 5A and 5B, the end effector 512 of the instrument 510 is repositioned. In other scenarios, other portions of instrument 510, or other instruments, can be repositioned instead or in addition to the end effector 512.

As shown in FIGS. 5A and 5B, a drivable assembly includes a drivable structure, where a drivable structure including a manipulator-supporting link 502, supports multiple manipulators 550, 552, and 554 coupled to multiple instruments 504, 510, and 516. In other words, the manipulator-supporting link 502 forms a common mechanical base for the manipulators 550, 552, and 554 that support the instruments 504, 510, and 516. In some embodiments, the manipulator-supporting link 502 corresponds to the manipulator-supporting link of a drivable structure as previously introduced with reference to FIG. 2A. Movement of one or more joints of the drivable structure, for example, results in movement of the manipulator-supporting link 502. When the manipulator-supporting link 502 is moved, the portions of the manipulators 550, 552, and 554 attached to the manipulator-supporting link 502 are also moved. Such caused motion of the manipulators 550, 552, and 554 can cause motion of the instruments 504, 510, and 516. For example, if the manipulators 550, 552, and 554 are held fixed in configuration, then the movement of the manipulator-supporting link 502 also moves instruments 504, 510, and 516.

In various embodiments, repositioning of an instrument (e.g., instrument 504, 510, or 516) through movement of a common mechanical base such as the manipulator-supporting link 502 is used to increase the degrees of freedom and/or the range of motion of an instrument (e.g., instrument 504, 510, or 516). For example, assume that an operator remotely controls the end effector 512 of instrument 510 by providing a commanded motion via the input devices 252 in FIG. 2A. And, further assume that, in the example of FIGS. 5A and 5B, the operator provides commands intended to cause the end effector 512 to interact with the target 596. In the configuration shown in FIG. 5A, the end effector 512 is unable to reach the target 596 if the manipulator-supporting link 502 does not move relative to the target 596. In this example, one factor contributing to the inability of the end effector 512 to reach the target 596 could be that the instrument 510 has fewer joints as compared to some other instruments. For example, instrument 510 lacks shaft offset joints while instruments 504 includes shaft offset joints 508 and instrument 516 includes shaft offset joints 520. If instruments 504, 510, and 516 are identical except that instrument 510 lacks shaft offset joints, then instruments 504 and 516 would generally have a greater number of degrees of freedom and/or an increased range of motion in comparison to instrument 510. However, even if instrument 510 includes additional joints such as shaft offset joints or other joints, end effector 512 may still be unable to reach target 596 without motion of the manipulator-supporting link 502 if the additional joints do not provide sufficient additional range of motion and/or do not support movement the applicable degree(s) of freedom. Accordingly, motion of the manipulator-supporting link 502 can be used to produce movement of the end effector 512 along a roll axis.

Various instruments may comprise or lack joints for various degrees of freedom. For example, any of instruments 504, 510, 516 could lack joints to support movement about a roll degree of freedom about a respective roll axis. As another example, an instrument may not include an articulated wrist. Also, the target 596 can be any kind of object, and the instrument 510 can be any kind of instrument equipped with an end effector suitable to interact with the target 596. For example, in a surgical scenario, the end effector could include forceps, and the target could include tissue.

In the example of FIGS. 5A and 5B, the end effector of instrument 516 includes an imaging device 518. In some embodiments, the imaging device 518 is configured to capture and provide images for display to an operator of the instruments 504 and 510. Where the instruments 504 and 510 are visible within these images, the images provide visual feedback that can be used by the operator of the instruments 504 and 510 in controlling the instruments 504 and 510. In the example of FIGS. 5A and 5B, the instruments 504, 510, and 516 are inserted through a cannula 530 toward a worksite 598 containing the target 596, and the cannula 530 is inserted through an aperture 592 in the barrier 594. In a medical scenario, the barrier 594 could be a body wall of a patient, and the aperture 592 could be a minimally invasive incision or a natural body orifice of the patient.

FIG. 5B illustrates a pivoting motion 532 of the drivable structure about a remote center of motion 540 (also called "remote center" 540). In the example shown in FIG. 5B, the drivable assembly has been positioned, and/or is controlled, such that the remote center of motion 540 is located approximately centrally in the aperture 592. As shown in the example of FIG. 5B, movement of the manipulator-supporting link 502 relative to the target 596, such as the pivoting motion 532 or some other movement (e.g., translational movement, combined translational and rotational movement, etc.), help enable the end effector 512 to execute a commanded motion indicated by the operator via the input devices 252 that the end effector 512 may not have been able to otherwise execute.

In one or more embodiments, the movement (e.g., pivoting motion 532) moves the manipulator-supporting link 502 supporting the manipulators 550, 552, and 554. Such motion of the manipulators 550, 552, and 554 can also move the instruments 504, 510, and 516. If the manipulators 550, 552, and 554 are held static relative to the manipulator-supporting link 502, then the instruments 504, 510, and 516 jointly move in a common motion in response to the movement of the manipulator-supporting link 502 (all pivoting about the remote center of motion 540 with the pivoting motion 532). Thus, the pivoting motion 532, if the manipulators are held static relative to the manipulator-supporting link 502, would cause motion of the end effectors 512 of the instrument 510 such that it reaches the position shown in FIG. 5B. In addition, the pivoting motion 532 would also cause motion of the end effector 506 and imaging device 518 of the instruments 504 and 516, such that the instruments 504 and 516 reach the position shown by dashed lines in FIG. 5B, if no motion occurs other than these caused motions. In the example shown in FIG. 5B, the movement of instrument 510 is commanded and thus is desired. However, the movement of instruments 504 and 516 that would result from performing only the pivoting motion 532, may not be commanded, expected, or desired. For example, if there was no caused motion, instruments 504, 516 could be expected to remain stationary, in absence of other movement commands. As another example, instruments 504, 516 could be expected to follow motion commands provided for these instruments, independent from the movement of instrument 510.

In some embodiments, the manipulators 550 and 554 (shown supporting the instruments 504 and 516), are driven to move in a manner that compensates partially or entirely for the motion caused by the movement of the manipulator-supporting link 502 (e.g., such as by pivoting motion 532). In some instances, compensating motion of joints of the instruments 504 and/or 506 are commanded in addition, or instead of, compensating motion of the manipulators 550 and 554. Thus, the compensation can involve movement of one or more joints of the manipulators 550, 552, and 554 supporting the instruments 504 and 516, and/or one or more joints of the instruments 504 and 516. For example, the compensation can involve moving the shaft offset joints (e.g., 508, 520) or other joints of the instruments (e.g., 504, 516), and/or moving the manipulators (e.g., 550, 554) to perform an insertion or retraction movement along the insertion axes of the instruments 504 and/or 516. The compensation can be performed such that the end effectors (e.g., end effector 506 or the end effector including imaging device 518) remain substantially stationary within the work site, while the end effector 512 of the instrument 510 is repositioned relative to the work site. As an example, methods for coordinating movements of multiple instruments of a drivable assembly are described in further detail in International Patent Publication No. WO2022/046787A1, entitled "Method and System for Coordinated Multiple-Tool Movement Using a Drivable Assembly," which is incorporated herein by reference.

In the above discussion, instrument 510 has fewer joints than instruments 504 and 516. However, more generally, instrument 510 can have the same or a greater number of joints, the same or a greater number of degrees of freedom, or the same or a greater range of motion as compared to any instruments supported by the manipulators 550 and 554. In all of these cases, movement of the manipulator-supporting link 502 can help increase the degrees of freedom and/or the range of motion of an instrument such as instrument 510 (or of another instrument coupled distally to the manipulator-supporting link (such as instrument 504, instrument 516, or some other instrument (not shown)).

Further, while FIGS. 5A and 5B illustrate a pivoting motion 532 in conjunction with the worksite being accessible through an aperture, the described methods apply to any type of movement and are not limited to a pivoting motion. For example, the movement of the manipulator-supporting link 502 could alternatively be, or include, one or more other rotational movements, linear or nonlinear translational movements, combinations of translational and rotational movements, and/or While FIGS. 1-5B show various configurations of components, in various embodiments, other configurations can be used without departing from the scope of the disclosure. For example, various components can be combined to create a single component. As another example, the functionality performed by a single component can be performed by two or more components. Further, while components are often described in context of medical scenarios such as surgical scenarios, embodiments of the disclosure are equally applicable to other domains that involve robotic manipulation, e.g., non-surgical scenarios or systems, non-medical scenarios or systems, and/or the like.

Constraining Motion of the Drivable Structure

In an example, a computer-assisted system comprises a drivable assembly and a processing system, where the drivable assembly comprises a drivable structure physically coupled to a manipulator, such that the drivable structure and the manipulator form a kinematic series with the drivable structure located proximally to the manipulator. The manipulator is configured to support an instrument. In response to a commanded motion, such as generated by the computer-assisted system autonomously or in response to a movement command received at an input device, the processing system commands motion of the drivable structure to achieve the commanded motion. For example, the movement command may be for be for a portion of the manipulator, and moving the drivable structure can move that portion of the manipulator. As another example, the movement command may be for an instrument supported by the manipulator, such as for an end effector or other part of the instrument, and moving the drivable structure can move that part of the instrument by moving the manipulator. In this manner, the drivable structure can "assist" the manipulator in moving the manipulator or an instrument supported by the manipulator to help achieve commanded motion.

Commanding the drivable structure to assist the motion of the manipulator can be useful, for example, when the instrument and the manipulator together lack the degrees-of-freedom (DOFs) or the range of motion needed to achieve the commanded motion. Commanding the drivable structure to move to assist the motion of the first manipulator can also be useful, for example, where motion of the drivable structure is preferred over motion of the instrument and/or the manipulator (even though the instrument or the manipulator may be able to achieve the commanded motion without assistance provided by drivable structure motion), such as to reduce motion of the manipulator, to save power, to provide greater stability, to move with greater physical inertia, etc.

In some instance, part of the drivable structure or a component attached to the drivable structure (e.g., an accessory temporarily or permanently attached to the drivable structure, such as a cannula where a cannula is mounted to the drivable structure) can be near or in a narrower access region, can be in other instances where reduced motion of the drivable structure relative to the environment is helpful to reduce likelihood of collisions and the like. In such situations, appropriately constraining the motion of the drivable structure can reduce the likelihood of collisions of the drivable assembly with the worksite, work piece, or other parts of the environment, and can also reduce the likelihood of internal collisions, where parts of the drivable assembly (e.g. the drivable structure, the manipulator(s) coupled to the drivable structure) or instruments or accessories supported by the drivable assembly, collide with each other or otherwise interfere with each other's motion. Reducing the likelihood of such events can increase the effectiveness and efficiency of operating the drivable structure, attached manipulators, and any instruments or accessories supported by the drivable structure or the attached manipulators, and the like.

In some cases, limiting the movement of the drivable structure, manipulator(s), and/or instrument(s) may be desirable. For example, referring to FIGS. 5A and 5B, part of the drivable assembly (e.g., manipulator-supporting link 502, manipulators 550, 552, and 554, and/or instruments 504, 510, and 516) could be positioned near or within a region with narrower access. Compared to a region with broader access, a commanded motion is more likely to cause collisions between components of the drivable assembly and other components of the drivable assembly, objects in the environment (e.g., worksite 598), an entry structure (e.g., cannula 530 or other entry guide), and/or the like. In such situations, constraining the motion of the drivable structure can reduce the likelihood of collisions and/or unintended motion of the instruments 504, 510, and/or 516.

As another example, referring to FIGS. 5A and 5B, the end effector of instrument 516 includes an imaging device 518 that could be configured to configured to capture and provide images for display to an operator of the instruments 504 and 510. In some embodiments, rolling the field of view of the imaging device 518 is performed by rolling the manipulator-supporting link 502 about a roll axis of the manipulator-supporting link 502. However, when the roll axis of the manipulator-supporting link 502 is not parallel to the field of view roll axis and/or when the manipulator-supporting link 502 roll axis is translationally (laterally) offset from the field of view roll axis, the manipulator-supporting link 502 may also need to pitch and yaw in order to roll the field of view in accordance with the commanded roll. However, pitching or yawing the manipulator-supporting link 502 in or near a narrow accessway can cause the manipulator-supporting link 502 to move outside of a limit appropriate for the narrow accessway and increase the risk of collision or unintended motion. Such yawing or pitching motion could also be associated with other portions of the drivable assembly (e.g., one or more manipulators, one or more instruments, one or more end effectors, and/or the like) moving outside of a motion limit appropriate for the procedure, which can reduce efficiency, reduce intuitiveness, increase power used by the system, reduce accuracy and precision of instrument motion, cause operator surprise, cause the portion(s) of the drivable assembly or any components supported by the portion(s) of the drivable assembly to collide with the environment (e.g., objects, the operator, individuals other than the operator, etc.), and/or the like.

To address the above effects, in some embodiments, a computer-assisted system (e.g., robotic system 200) is configured to define a drivable structure limit for a drivable structure. For example, the drivable structure limit can be a non-zero motion limit that is applied to the drivable structure. Generally, a drivable structure limit can be any configurable value, including zero. In various embodiments, the drivable structure limit includes at least one non-zero value along at least one dimension or degree of freedom. Additionally, the drivable structure limit can be defined in joint space, Cartesian space, or any other appropriate space. In some embodiments, the drivable structure limit is a position limit associated with the drivable structure, a portion of the drivable structure, and/or an element rigidly attached to the drivable structure. In some embodiments, the drivable structure limit is a velocity limit associated with a velocity of the motion of the drivable structure, a portion of the drivable structure, and/or an element rigidly attached to the drivable structure.

The drivable structure limit can be a hard limit or a soft limit. A hard drivable structure limit cannot be exceeded, and the computer-assisted system works to prevent motion of the drivable structure that exceeds the hard limit (e.g. by driving actuators or brakes to try to prevent such motion, by having hardware designs that prevent such motion, etc.). A soft drivable structure limit can be exceeded, but the computer-assisted system commands resistance to motion of the drivable structure that exceeds the soft limit. Commanding resistance includes providing visual and/or physical feedback, guidance, and/or other indications to an operator to encourage input that does not exceed the soft limit. For example, if an operator inputs a command that causes motion that would exceed the soft limit, the computer-assisted assembly could notify the operator that the soft limit is about to be or has been exceeded (e.g., via visual indication on a display unit 274, haptic feedback on one or more input devices 252, and/or the like). However, if the operator continues to command motion that exceeds the soft limit, then the computer-assisted assembly would still perform the commanded motion or a modified commanded motion (e.g., a dampened motion, a scaled down motion, etc.) version of the commanded motion. In some embodiments, a drivable structure limit can include one or more hard limits, one or more soft limits, or a combination of hard and soft limits.

In some embodiments, a drivable structure limit is defined based on one or more of: a type of procedure being performed by the drivable assembly, a stage of procedure being performed by the drivable assembly, and/or an operating mode of the drivable structure. In some instances, the drivable structure limit is defined further based on other parameters not listed in the foregoing. In some instances, whether the drivable structure limit is a hard or soft limit is defined based on one or more of the foregoing. In some instance, the amount of resistance for a soft limit is defined based on one or more of the foregoing. In some instances, the magnitude, size, shape, and/or other parameter of the drivable structure limit is defined based on one or more of the foregoing.

The type or stage of procedure can be determined through any appropriate manner, including by analyzing data associated with environmental or operating conditions (e.g., images of the procedure and/or of the operating environment to gauge context), the type of instruments being supported by the drivable assembly and/or drivable structure (e.g., needle drivers, electrocautery devices, cutting instruments), presence of components (e.g., specimen bags or rulers), the type of other instruments being interacted with, the number of instruments inserted, an amount of time into the procedure, operator input of information related to the type of procedure, and/or the like. In some embodiments, input from one or more sensors is analyzed to determine the boundaries of a workspace in which the drivable assembly is being operated, such as boundaries within a patient anatomy in a medical example, within which the drivable assembly can safely operate. A drivable structure limit is generated based on the determined boundaries. As an example, sensor data could be analyzed to determine a three-dimensional boundary beyond which are one or more portions of the patient anatomy, patient positioning aids, stirrups, non-sterile equipment, medical personnel, lights or walls or ceilings, equipment, and/or the like. A drivable structure limit could be generated that follows the three-dimensional boundary. As another example, sensor data could be analyzed to determine one or more regions into which impingement of the drivable structure is undesirable. A drivable structure limit could be generated that separates such regions from the drivable structure. The drivable structure limit need not enclose the entire region. In some embodiments, a drivable structure limit can be applied to all commands, or only some commands (e.g., commands based on operator input, commands generated by the computer-assisted system by itself, roll commands, commands to particular instruments or manipulators, and/or the like).

In some embodiments, the computer-assisted system stores one or more pre-defined drivable structure limits (also referred to herein as "pre-defined limits"). During operation, the computer-assisted system determines, based on one or more parameters (e.g., operating mode of the drivable structure, type(s) of instrument(s) being used by the drivable assembly, type of procedure being performed, stage of procedure being performed, type of command being received, and/or the like), whether any of the pre-defined drivable structure limits should be applied. In some embodiments, the computer-assisted system stores one or more rules for computing drivable structure limits. During operation, the computer-assisted system computes a drivable structure limit based on one or more parameters. For example, the computer-assisted system could be configured to compute a drivable structure limit based on parameters specifying the type of procedure being performed and one or more characteristics of the worksite. In some embodiments, a drivable structure limit can be defined by an operator, for example, via an input device 252.

In some embodiments, different types of procedures are associated with different types and/or amounts of drivable structure limits. In some embodiments, when the drivable assembly is included in a medical robotic system, if the type of procedure being performed is a procedure that is performed with at least a portion of the drivable assembly (e.g., drivable structure, manipulator, instrument, and/or the like) inserted into a natural orifice of the patient, the drivable structure limit could be a more restrictive limit compared to procedures that are not performed with the at least a portion of the drivable assembly inserted into a natural orifice of a patient. Procedures that are not performed with at least a portion of the drivable assembly inserted into a natural orifice include, for example and without limitation, procedures that are performed with an instrument external to the patient (e.g., on the surface of a patient or in an open procedure) or with an instrument inserted in a region of the patient with more working space (e.g., into an insufflated abdomen of the patient). In some embodiments, the computer-assisted system selects a more restrictive limit from a plurality of pre-defined limits, or computes the more restrictive limit, in response to determining that the procedure being performed is one where at least a portion of the drivable assembly is inserted into a natural orifice. As a medical example, in a trans-oral or trans-anal procedure where an entry guiding device (such as a cannula or guide tube) is utilized, it can be desirable for an orientation or a position of the entry guiding device to remain within a tight tolerance of a reference setting or an initial setting. For example, it may be helpful to limit the pitch, yaw, and/or roll of such entry guiding device, or the lateral or longitudinal translation of such entry guiding device to below respective tolerances. Accordingly, a drivable structure limit could be defined for a trans-oral and/or trans-anal procedure that limits or prevents the entry guiding device from reorienting in one or more rotational degrees of freedom, or limits or prevents entry guiding device from translating in one or more translational degrees of freedom, within some period associated with the procedure (e.g. from setup to during the procedure until takedown). Where the entry guiding device can be externally manipulated to change in physical shape or size, such as through internal degrees of freedom, a drivable structure limit could be defined to limit the external forces and torques applied to the entry guiding device, to help limit such configuration change. As another medical example, in some other procedures such as some abdominal procedures or mastectomies where an entry guiding device (such as a cannula or guide tube) is utilized, the orientation of the entry guiding device may need to change substantially during the procedure, to allow access necessary anatomy for the procedure. Accordingly, a drivable structure limit could be defined for such other procedures with looser (larger) orientation change tolerances as compared to the drivable structure limit for the above-discussed trans-oral and/or trans-anal procedure. Such looser (larger) orientation change tolerance would allow for greater reorientation of the entry guiding device.

In some embodiments, different stages of a given procedure are associated with different types and/or amounts of drivable structure limits. In some embodiments, a later stage of a procedure is associated with a more restrictive limit compared to earlier stages of the procedure. In the context of a medical procedure, an earlier stage could include, for example, initial access, approaching the site of a medical procedure, and/or the like. A later stage could include, for example, manipulator, cutting, suturing tissue, and/or the like. In some embodiments, the computer-assisted system selects a more restrictive limit from a plurality of predefined limits, or computes the more restrictive limit, in response to determining that the stage of the procedure is associated with a more restrictive limit.

In some embodiments, different operating modes are associated with different types and/or amounts of drivable structure limits. For example, a roll-constrained operating mode could be associated with drivable structure limits that constrain motion of the drivable structure to motion along the roll-axis of the drivable structure. As another example, one or more operating modes that are associated with narrower access to a worksite could be associated with more restrictive drivable structure limits compared to operating modes that are not associated with narrower access (e.g., that have wider access to a worksite or do not have access restrictions).

In some embodiments, a drivable structure limit is a range of motion limit, such as for one or more joints of a drivable structure (e.g., a joint limit) and/or for a portion of the drivable structure or other elements rigidly attached to the drivable structure (e.g., a cannula). In some embodiments, a drivable structure limit is a spatial limit applied to the drivable structure generally, such as one or more regions that the drivable structure should stay within and/or one or more regions that the drivable structure should stay out of. For example, a drivable structure limit can be a spatial limit that is based on the operating environment (e.g., limits based on objects in the environment, such as worksite 598, to avoid collision with those objects). As another example, the drivable structure limit can be a spatial limit that is based on the physical design or configuration of the drivable structure (e.g., to reduce chances of the drivable assembly tipping over). In various embodiments, a spatial limit is of any suitable dimension (e.g., two-dimensional or three-dimensional) and/or any suitable shape (e.g., conical, oval). The shape of a given drivable structure limit can vary depending on the environment (e.g., shape of anatomy that is trying to avoid) and/or the shape of an entry structure (e.g., cannula 530).

In various embodiments, a drivable structure limit can be defined for one or more particular joints, one or more particular links, other portions of the drivable structure, and/or one or more elements rigidly attached to the drivable structure. In some embodiments, the drivable structure limit is applied separately to each degree of freedom, for example, of the one or more particular joints, one or more particular links, other portions of the drivable structure, one or more elements rigidly attached to the drivable structure, or a particular defined region around the drivable structure. In some embodiments, a drivable structure limit is specified for one or more particular degrees of freedom, and different drivable structure limits is applied to different degrees of freedom. In some embodiments, the drivable structure limit is applied to a combination of motion along multiple alignment axis (e.g., to a vector sum of velocities for various degrees of freedom). In various embodiments, the drivable structure limit is applied to one or more positional degrees of freedom and/or one or more orientational degrees of freedom. In various embodiments, the drivable structure limit is "spatially anisotropic" and imposes different limits in different spatial directions of motion for at least a portion of the drivable structure. For example, the drivable structure limit can comprise a plurality of motion limits, where each motion limit included in the plurality of motion limits specifies a different limit amount for a different spatial degree of freedom (e.g., a first amount for a first degree of freedom in a first direction, a second amount for the first degree of freedom in a second direction, and so forth). Thus, motion limits of the plurality of motion limits can be of different amounts for different degrees of freedom, or be different amounts in different directions for a given degree of freedom (e.g., different amounts in a positive direction as compared to a negative direction). As another example, different limits could be imposed on different joints and/or on different spatial directions of motion for at least a portion of the drivable structure. In some embodiments, spatial directions are defined in a spatial frame (e.g., Cartesian frame) and are not specific to any given joint of the drivable structure. For example, the drivable structure motion can limit the motion in the X, Y, and/or Z direction of an end effector, a portion of a link of the drivable structure, and/or the like in a world frame. In various instances, the drivable structure limit can be represented by a boundary of any appropriate shape and size within a Cartesian and/or joint space.

In some embodiments, the computer-assisted system reduces or prevents motion along one or more degrees of freedom of one or more joints of the drivable structure and/or within a defined region around the drivable structure in accordance with one or more drivable structure limits.

As an example, the drivable structure could include a roll-constrained mode of operation. The computer-assisted system receives input indicating a target motion for an instrument, where the target motion includes a rotation about a roll axis of the instrument. For example, the target motion could be for the field of view of an imaging device (e.g., imaging device 518). The target motion includes a rotation of the field of view about a field of view roll axis. In some embodiments, the target motion is indicated as a target motion of the imaging device and includes a rotation of the imaging device about a roll axis of the imaging device. The computer-assisted system determines a commanded motion of one or more joints of the drivable structure based on the input. This commanded motion includes a rotation of a portion of the drivable structure about a drivable structure roll axis. Rotating the portion of the drivable structure about the drivable structure roll axis assists the rotation of the field of view about the field of view roll axis. The commanded motion is constrained by a drivable structure limit of the drivable structure. The drivable structure limit could be defined based on the roll-constrained mode of operation, and limits motion of the drivable structure along the pitch and yaw axis to reduce or prevent pitch and yaw motion when rolling the drivable structure about the drivable structure roll axis.

In some embodiments, determining the roll axis for roll motion of an imaging device is based on a position of a center line of the direction of view of the imaging device, a position of a center line of the shaft of the imaging device, and/or a position of a center line or a roll axis of an entry guide, cannula, guide tube, and/or the like. In some embodiments, determining the roll axis for roll motion of an imaging device is based on an aggregate of the center lines of multiple instruments (e.g., the imaging device and other instruments supported by the drivable structure).

In some embodiments, instead of or in addition to reducing or preventing motion of the drivable structure, the computer-assisted system provides haptic feedback to an input device used by an operator. In some embodiments, the haptic feedback causes the input device to resist input commands where the commanded motion requirements movement of the drivable structure, manipulators, and/or instruments that cannot be achieved due to one or more drivable structure limits.

In some embodiments, the haptic feedback guides the operator towards commanding inputs that keep the drivable structure within the drivable structure limits. For example, in the roll-constrained mode of operation described above, haptic feedback could be provided to guide the operator towards input commands that assisting the rolling of the instrument or imaging device, while reducing or avoiding undesired pitch and/or yaw motion.

Figure 6:
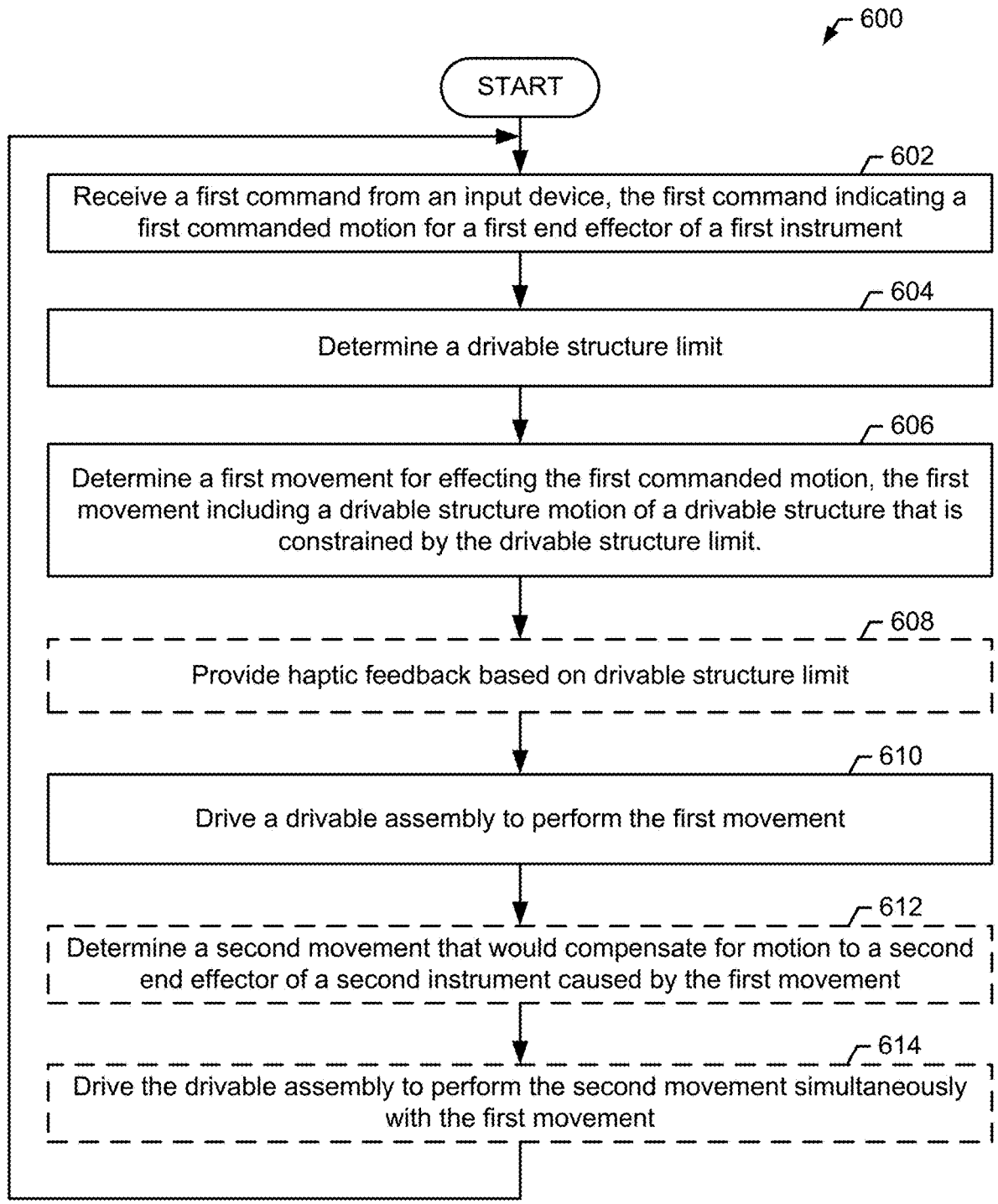
FIG. 6 illustrates a flowchart of example steps for constraining movement of a drivable structure, according to various embodiments.

FIG. 6 illustrates a flowchart of example steps for constraining movement of a drivable structure, according to various embodiments. In some embodiments, the method 600 is executed repeatedly to control joint configurations of a drivable assembly based on commands received from one or more input devices. The drivable assembly could be, for example, any of the drivable assemblies described in FIGS. 1-5B, including drivable assembly 100, drivable assembly 210, or drivable assembly 300, and/or any other suitable drivable assembly.

The steps below are discussed with reference to a drivable assembly that includes a drivable structure, a first manipulator mechanically coupled to the drivable structure, and a second manipulator mechanically coupled to the drivable structure. In some embodiments, a first instrument is mechanically coupled to the first manipulator, and a second instrument is mechanically coupled to the second manipulator. The first manipulator and first instrument together include a plurality of first links coupled by a plurality of first joints. The second manipulator and second instrument together include a plurality of second links coupled by a plurality of second joints. In various embodiments, the drivable assembly can include any number of drivable structures and each drivable structure can be of any configuration (i.e., any number of joints of any type and/or any number of links of any geometric configuration). Each drivable structure can be coupled to any number of manipulators and support any number and/or type of instruments.

Figure 7:
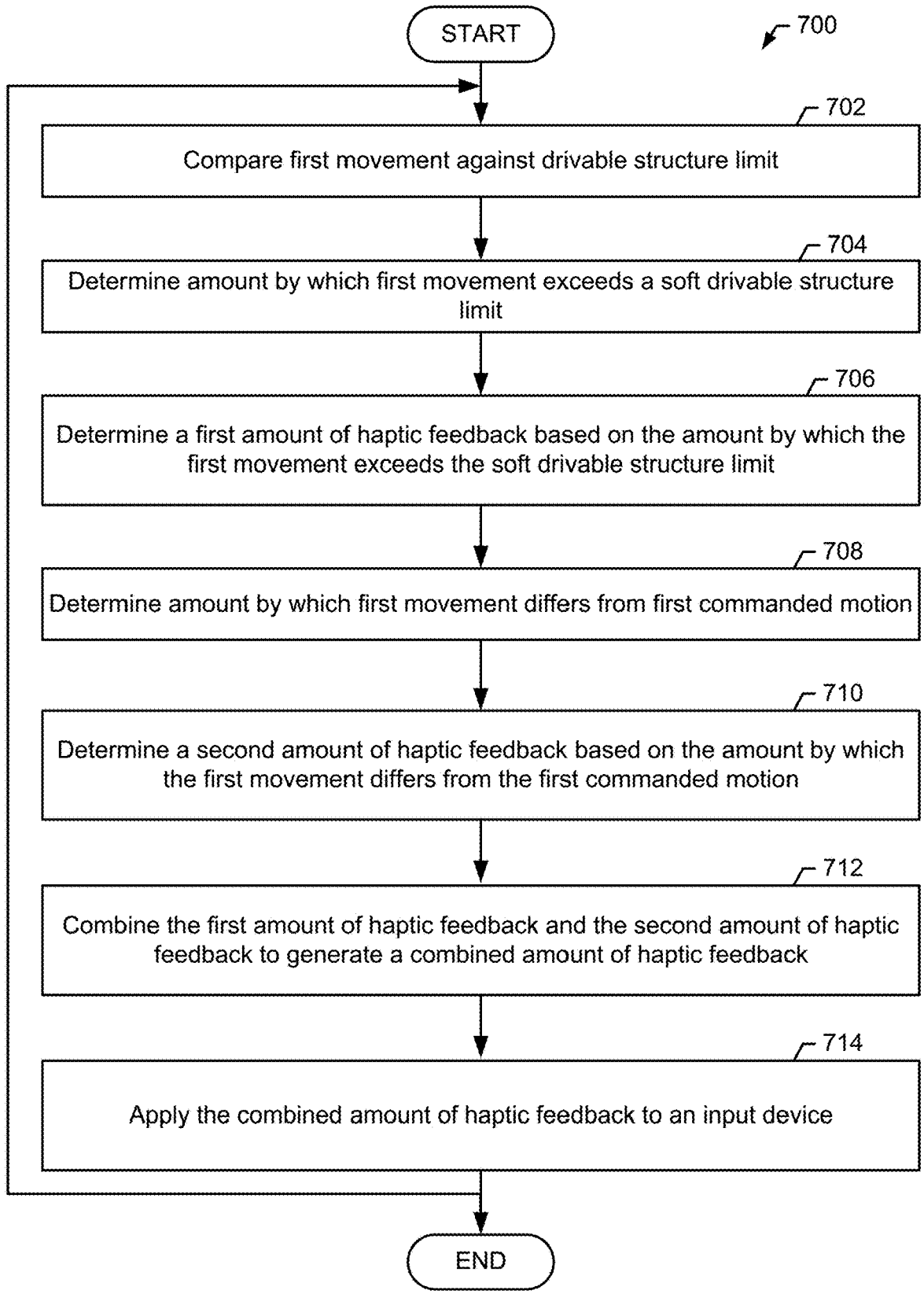
FIG. 7 illustrates a flowchart of example steps for providing haptic feedback based on a drivable structure limit, according to various embodiments.

FIGS. 6 and 7 are flowcharts showing example methods 600, 700. Although each of these flowcharts show a certain number of steps, it is understood that fewer or more or different steps may be included in a particular embodiment. For example, FIG. 6 shows steps 608, 612, and 614 in dotted boxes as express examples of optional steps, one or more of which may not be included in a particular embodiment. However, other steps of FIG. 6 may not be included in a particular embodiment. As another example, FIG. 7 shows no steps in dotted boxes. However, one or more of the steps shown in FIG. 7, such as steps 704 and 706, or steps 708 and 710, and/or step 712 may not be present in a particular embodiment. Further, additional steps may be added to the method 600 or the method 700. Also, the steps shown in FIGS. 6 and 7 may differ in insignificant or substantial manners in any particular embodiment.

The flowcharts of FIGS. 6 and 7 show certain steps in a particular order. However, it is understood that the order may differ for any particular embodiment. Steps shown serially may occur in parallel in some embodiments. Steps shown later may take place earlier in some embodiments. As a first example, step 608 can be performed in parallel with, or after, step 610. As another example, step 612 can be performed before step 608 and before step 610. As a further example, step 614 can be performed before, after, or in parallel with, step 610. As yet another example, each of step 708 or step 710 can be performed before, or in parallel with, step 704 or step 706. Steps that are performed in parallel can temporally overlap in part or be coterminous.

As shown in FIG. 6, the method 600 begins at step 602, where a first command is received from an input device, where the first command indicates a first commanded motion for a first end effector of a first instrument. The first end effector can be any suitable end effector, such as an imaging end effector, an irrigation or suction end effector, a physical manipulation end effector, an energy-application end effector, a cutting end effector, a stapling end effector, and/or the like. The input device could be, for example and without limitation, a single input device that is controlled by a single hand of the operator, multiple input devices operating in conjunction with one another (e.g., a pair of two input devices with a simulated or physical handlebar), and/or the like. As an example, a computing system 272 could receive the first command from one or more input devices 252 to move imaging device 518 of instrument 516.

The input device has one or more degrees of freedom (e.g., forward-backward, up-down, left-right, pitch, yaw, and/or roll degrees of freedom). Different input devices can have different degrees of freedom. The input device from which the first command is received can have a different number of a degree of freedom than the first instrument. For example, the first command could be received from an input device that has a roll degree of freedom, while the first instrument does not have a roll degree of freedom.

In some embodiments, the first command is a system-generated command (e.g., automatically generated by computing system 272) instead of received from an input device. For example, computing system 272 could generate a command to move the end effector to a pre-defined position in response to entering a given mode of operation.

At step 604, a drivable structure limit is determined for the drivable structure. The drivable structure limit defines a limit for motion of the drivable structure. In some embodiments, the drivable structure limit is determined based on one or more of: a type of procedure being performed by the drivable assembly, a stage of procedure being performed by the drivable assembly, an operating mode of the drivable assembly, and/or the like.

In some embodiments, determining the drivable structure limit includes retrieving the drivable structure limit from a set of stored drivable structure limits. For example, computing system 272 could be configured with a plurality of pre-defined drivable structure limits. Computing system 272 identifies one or more pre-defined drivable structure limits included in the plurality of pre-defined drivable structure limits to use in constraining motion of the drivable structure. In some embodiments, identifying the one or more pre-defined drivable structure limits is based on one or more parameters, such as the current operating mode, the type of instruments included in the drivable assembly, the type of procedure being performed, the current stage of the procedure being performed, the first command, and/or the like. In some embodiments, determining the drivable structure limit includes computing the drivable structure limit. For example, computing system 272 could be configured with a plurality of rules and/or algorithms for calculating a drivable structure limit based on one or more of the above parameters.

In some embodiments, parameter values for each of the one or more parameters used to select or compute a drivable structure limit are determined. For example, computing system 272 could determine the type or stage of a procedure being performed based on analyzing the worksite, the environment surrounding the computing system 272, the type of instruments supported by the drivable assembly, the type of instruments or other objects being interacted with by the drivable assembly, and/or the like.

In some embodiments, computing system 272 receives operator input specifying the drivable structure limit. In some embodiments, computing system 272 receives operator input (e.g., operating mode, type of procedure, stage of procedure, and/or the like) and computes one or more parameter values for selecting or computing the drivable structure limit based on the operator input.

In some embodiments, the drivable structure limit includes a limit (e.g., range of motion or spatial limit) for one or more of: one or more particular joints of the drivable structure, one or more particular links of the drivable structure, one or more particular links of a manipulator coupled to the drivable structure (e.g., the first manipulator), one or more particular joints of a manipulator coupled to the drivable structure, one or more elements rigidly attached to the drivable structure (e.g., a cannula), and/or the like. Determining the drivable structure limit includes determining the one or more limits. In some embodiments, a given limit is for one or more particular degrees of freedom without limiting one or more other degrees of freedom. Determining the drivable structure limit includes determining a limit, if any, for each degree of freedom. Accordingly, the drivable structure limit can include multiple component limits corresponding to different degrees of freedom and/or different components of the drivable assembly.

At step 606, a first movement for effecting the first commanded motion is determined. The first movement includes a drivable structure motion of the drivable structure, where the drivable structure motion is constrained by the drivable structure limit. In some embodiments, the first movement moves one or more joints associated with the drivable structure. For example, referring to FIGS. 5A and 5B, the drivable structure motion could be motion of the manipulator-supporting link 502.

In some embodiments, the first movement further includes a relative motion of the first end effector relative to the drivable structure. The relative motion of the first end effector could be, for example, an insertion/retraction of the first instrument along the insertion axis of the first instrument, an opening/closing of the first end effector of the first instrument, a pivoting of the first end effector (e.g., at a wrist) of the first instrument, and/or any other actuation of the first end effector. For example, if the first commanded motion is for end effector 512 to grasp target 596, the first movement could include closing the end effector 512, pivoting end effector 512 at a wrist 514, and/or the like. As another example, if the first commanded motion is for rolling imaging device 518, the first movement could include motion of the imaging device 518 (e.g., one or more joints of the imaging device 518) to affect the roll and/or to reduce non-roll movements caused by the drivable structure motion.

In some embodiments, a precursor drivable structure motion (also called "precursor motion" herein) is obtained by executing control methods described above with respect to computing system 272. For example, the first commanded motion could be processed by one or more inverse kinematics algorithms to obtain joint positions (e.g., joint angles for rotary joints) for the joints associated with the drivable structure.

In some embodiments, the precursor drivable structure motion is compared against the drivable structure limit. Comparing the precursor drivable structure motion could include comparing an anticipated location and/or position of one or more links, one or more joints, one or more manipulators (e.g., the first and/or second manipulator), or one or more instruments (e.g., the first and/or second instrument) and/or any portion thereof against the drivable structure limit. The specific component location(s) and/or position(s) that are compared depends on the component(s) for which a limit is specified by the drivable structure limit.

In some embodiments, the drivable structure limit, or a component of the drivable structure limit, is specified in a first space (e.g., Cartesian) and the first movement is defined in a second space (e.g., joint space). Comparing the precursor drivable structure motion against the drivable structure limits includes converting between the first space and the second space using one or more kinematic models of the drivable structure (e.g., convert drivable structure limit to joint space or convert joint positions to Cartesian space).

In some embodiments, if the precursor drivable structure motion exceeds the drivable structure limit, then the precursor drivable structure motion is limited based on the drivable structure limit. Limiting the precursor drivable structure motion could include preventing the drivable structure motion in one or more degrees of freedom, adjusting (e.g., reducing) the drivable structure motion in one or more degrees of freedom, preventing motion of one or more joints, and/or the like. For example, if the drivable structure limit specifies a region in which the drivable structure should stay within, the joint position of one or more joints could be adjusted to keep the drivable structure within the specified region. If the precursor drivable structure motion was limited or otherwise modified, then the drivable structure motion included in the first movement is the modified drivable structure motion. If the precursor drivable structure motion was not modified, then the drivable structure motion included in the first movement is the precursor drivable structure motion.

In some embodiments, a drivable structure limit includes a hard limit and/or a soft limit. The drivable structure motion is limited if the drivable structure motion exceeds the hard limit. If the drivable structure motion exceeds the soft limit but does not exceed the hard limit, then the drivable structure motion is not limited.

Optionally, at step 608, haptic feedback is provided based on the drivable structure limit. As discussed in detail below with respect to FIG. 7, the haptic feedback is computed based on whether and/or how much the drivable structure motion exceeds the drivable structure limit, and is used to indicate to an operator that the motion of the drivable structure was prevented and/or adjusted based on the drivable structure limit and/or that the motion of the drivable structure exceeds a soft limit specified by the drivable structure limit.

In some embodiments, the haptic feedback is provided on the input device from which the first commanded motion was received. In some embodiments, the first commanded motion is received from a combination of multiple input devices (e.g., a pair of input devices connected via a physical or simulated handlebar). The haptic feedback is provided on at least one input device included in the multiple input devices.

At step 610, the drivable assembly is driven to perform the first movement. In some embodiments, driving the drivable assembly involves driving the individual joints of the drivable assembly using the outputs of the inverse kinematics algorithm generated when determining the first movement. The outputs of the inverse kinematics algorithm include joint states (e.g., position, orientation, linear or angular velocity, and/or acceleration) used for driving joint actuators (e.g., joint actuators of the drivable structure, first and second manipulators, and first and second instruments). For example, computing system 272 could transmit commanded joint positions and/or velocities to joint controllers for the different joints. A joint controller receives a commanded joint position and/or joint velocity and converts the received commanded joint positions or velocities into commanded current or voltage signal(s) to drive the actuators producing joint movements.

In some embodiments, the drivable structure motion, if performed in isolation (i.e., without any compensatory movements) causes motion of both the first end effector of the first instrument and the second end effector of the second instrument. For example, referring to FIG. 1, instrument 122 and instrument 124 are coupled to manipulators 102 and 104, respectively. Because manipulators 102 and 104 are both, in turn, coupled to drivable structure 106, motion of drivable structure 106 in response to commanded motion of instrument 124 causes motion of instrument 122 in addition to causing the commanded motion of instrument 124. Similarly, referring to FIG. 5A, motion of manipulator-supporting link 502 causes motion of each of end effectors 506, 512, and the end effector comprising imaging device 518.

As a result, optionally, at step 612, a second movement that compensates for motion to a second end effector of a second instrument that is caused by the first movement is determined. The second movement compensates for the motion caused to the second end effector in order to maintain the state of the second end effector when the second movement is executed simultaneously with the drivable structure motion. The second movement includes movements of one or more joints of the second manipulator and/or the second instrument that would maintain a state (e.g., a position and/or orientation, or a linear or angular velocity or acceleration) of the second end effector while the first movement is being performed is determined.

In some embodiments, the second movement is obtained by executing control methods as described with respect to computing system 272. For example, the first commanded motion could be processed by an inverse kinematics algorithm to obtain joint positions (e.g., joint angles for rotary joints) for the joints involved in the second movement.

In step 614, the drivable assembly is driven to perform the second movement simultaneously with the first movement. Driving the drivable assembly to perform the second movement is performed in a manner similar to that discussed above with respect to performing the first movement in step 610.

In some embodiments, if the second movement is limited (e.g., due to range of motion constraints or anticipated collision), the first movement could be prevented or adjusted to ensure that the movements resulting from performing the first and second movement are not incompletely performed. For example, if the first movement could be limited to movements where the caused motion to the second end effector is able to be compensated.

In some embodiments, the method 600 returns to step 602, where a next command is received from an input device. The input device could be the same input device from which a command was previously received, or a different input device. Similarly, the next command could be for movement of the same end effector of the same instrument, or could be for a different end effector and/or instrument.

While the method of FIG. 6 is used to constrain drivable structure movement(s), the method is not necessarily always active. For example, in some embodiments, the method is performed when a limited drivable structure motion input mode has been activated (e.g., a roll-constrained mode for an imaging device) and is not performed when the limited drivable structure motion input mode is not active. The limited drivable structure motion input mode could be activated, for example, by the operator via an input device or input device element (e.g., button, pedal, lever, switch, and/or the like), the operator selecting a menu option from a touch screen (e.g., via display unit 254), the operator speaking a voice command, and/or the like. In some embodiments, the computing system 272 automatically activates a limited drivable structure motion input mode based on a type of procedure, stage of a procedure, and/or operating mode. For example, if a drivable structure limit is defined for a specific type of procedure, computing system 272 could automatically activate a limited drivable structure motion input mode in response to determining that the procedure being performed is the specific type of procedure.

FIG. 7 illustrates a flowchart of example steps for providing haptic feedback based on a drivable structure limit, according to various embodiments. In some embodiments, the method 700 shown in FIG. 7 is executed while the method 600 is executed (e.g., is executed each time that step 608 is performed).

As shown in FIG. 7, the method begins at step 702, where the first movement is compared against the drivable structure limit.

In some embodiments, the drivable structure limit is compared against the position and/or location of one or more joints of the drivable structure, one or more links of the drivable structure, one or more portions of the drivable structure, one or more instruments supported by the drivable structure, one or more end effectors of the one or more instruments, and/or the like.

In some embodiments, the drivable structure limit includes multiple components, where each component corresponds to a different component of the drivable assembly (e.g., a joint, link, drivable structure portion, instrument, end effector, and/or the like) and/or to a different degree of freedom. The first movement is compared against each component of the drivable structure limit.

At step 704, an amount by which first movement exceeds a soft drivable structure limit is determined. In some embodiments, the amount by which the first movement exceeds a soft drivable structure limit is computed separately for one or more components of the drivable assembly (e.g., one or more joints of the drivable structure, one or more portions of the drivable structure, one or more manipulators, one or more instruments, and/or the like). In some embodiments, the amount by which the soft drivable structure limit is exceeded is computed separately for each degree of freedom. For example, the amount exceeding is determined separately for roll, pitch, and yaw motions, and no additional resistance may be applied to resist roll motion, a first resistance is applied to resist pitch motion, and a second resistance is applied to resist yaw motion. The specific components whose motion is compared against the soft drivable structure limit and/or the specific degrees of freedom can vary depending on the specific motion limits specified by the soft drivable structure limit.

In some embodiments, the soft drivable structure limit, or a component of the drivable structure limit, is specified in a first space (e.g., Cartesian) and the first movement is defined in a second space (e.g., joint space). Comparing the first movement against the soft drivable structure limit includes converting the first movement from the second space to the first space using one or more kinematic models of the drivable structure. In some embodiments, the amount by which the first movement exceeds the soft drivable structure limit is determined in Cartesian space.

At step 706, a first amount of haptic feedback is determined based on the amount by which the first movement exceeds the soft drivable structure limit. The first amount of haptic feedback indicates to an operator that the first movement exceeded a soft drivable structure limit, and is used to provide resistance to operator input commands that violate the soft drivable structure limit. Such resistance can help guide the operator to provide input commands that do not violate the soft drivable structure limit, and resists input commands from the operator that violate the soft drivable structure limit. For example, if a soft drivable structure limit is used for roll-constrained motion, a soft drivable structure limit could specify limits on motion in the pitch and yaw degrees of freedom and no limits on motion in the roll degree of freedom. The first amount of haptic feedback resists movement of one or more input control that introduce pitch and yaw motion and allows roll motion. Accordingly, in such cases, the first amount of haptic feedback can be used to guide an operator in inputting commands for roll motion without introducing undesired pitch and/or yaw motion.

In some embodiments, the first amount of haptic feedback is based on the amount by which the commanded motion exceeds the soft drivable structure limit (e.g., how far the commanded motion is past a soft drivable structure limit boundary). In some embodiments, the first amount of haptic feedback is proportional to the amount by which the first movement exceeds the soft drivable structure limit (e.g., weighted or scaled). If the drivable structure limit did not include a soft limit or a soft drivable structure limit was not exceeded, then the amount by which the first movement exceeds the soft drivable structure limit is zero. As a result, the first amount of haptic feedback would also be zero. In some embodiments, the amount by which the first movement exceeds the soft drivable structure limit and the first amount of haptic feedback are defined in Cartesian space.

In some embodiments, at step 704, a separate amount by which the soft drivable structure limit is exceeded is computed for each degree of freedom. Accordingly, a different amount of haptic feedback corresponding to each degree of freedom is also determined based on the amount by which the soft drivable structure limit is exceeded for the degree of freedom. In some embodiments, the first amount of haptic feedback is determined by combining the different amounts of haptic feedback determined for the different degrees of freedom (e.g., vector sum of amount of haptic feedback for each degree of freedom). In some embodiments, the different amounts of haptic feedback are determined in Cartesian space.

At step 708, an amount by which first movement differs from first commanded motion is determined. The amount by which the first movement differs from the first commanded motion indicates an amount by which the first commanded motion exceeds a hard drivable structure limit, for example, when the drivable structure motion is limited based on the hard drivable structure limit.

In some embodiments, the amount by which the first movement differs from the first commanded motion is computed separately for one or more components of the drivable assembly (e.g., one or more joints of the drivable structure, one or more portions of the drivable structure, one or more manipulators, one or more instruments, and/or the like). In some embodiments, the amount by which the first movement differs from the first commanded motion is computed separately for each degree of freedom, such as described in conjunction with step 704. The specific components whose motion is compared against the first commanded motion and/or the specific degrees of freedom can vary depending on the first commanded motion.

In some embodiments, the difference between the first commanded motion and the first movement is computed based on a frame of reference of the drivable structure, instrument, end effector, and/or the like, and converted to a frame of reference of the input device. In some embodiments, the first commanded motion is defined in a first space (e.g., Cartesian) and the first movement is defined in a second space (e.g., joint space). Comparing the first movement against the first commanded motion includes converting the first movement from the second space to the first space using one or more kinematic models of the drivable structure. In some embodiments, the amount by which the first movement differs from the first commanded motion is determined in Cartesian space.

At step 710, a second amount of haptic feedback is determined based on the amount by which the first movement differs from the first commanded motion. The second amount of haptic feedback indicates to an operator that the first commanded motion was limited by a hard drivable structure limit, and is used to provide feedback on the portions of the first commanded motion that were not performed. For example, a hard drivable structure limit could be used for roll-constrained motion. The hard drivable structure limit could specify limits on motion in the pitch and yaw degrees of freedom and no limits on motion in the roll degree of freedom. If the first commanded motion includes motion in the pitch and/or yaw degrees of freedom in addition to motion in the roll degree of freedom, then the first movement could include the roll motion but not the pitch and/or yaw motion. The second amount of haptic feedback is used to indicate that the first commanded motion included pitch and/or yaw motion that was prevented. As another example, the hard drivable structure limit could specify a region that the drivable structure cannot enter. If the first commanded motion includes motion that would cause a portion of the drivable structure to enter the specified region, then the first movement is limited to include only motion of the drivable structure until the boundary of the specified region is reached. The second amount of haptic feedback is used to indicate the amount by which the first commanded motion included motion into the specified region that was prevented.

In some embodiments, the amount of haptic feedback is based on the amount by which the commanded motion differs from the first movement (e.g., how far the commanded motion exceeded a hard drivable structure limit). In some embodiments, the second amount of haptic feedback is equal to the amount by which the commanded motion differs from the first movement. In some embodiments, the second amount of haptic feedback is proportional to the amount by which the commanded motion differs from the first movement (e.g., weighted or scaled). If the drivable structure limit did not include a hard limit or a hard drivable structure limit was not exceeded, then the first commanded motion and the first movement is the same and the amount by which the first movement differs from the first commanded motion is zero. As a result, the second amount of haptic feedback would also be zero.

In some embodiments, at step 708, a separate amount by which the first movement differs from the first commanded motion is computed for each degree of freedom. Accordingly, a different amount of haptic feedback corresponding to each degree of freedom is also determined based on the difference for the degree of freedom. In some embodiments, the second amount of haptic feedback is determined by combining the different amounts of haptic feedback determined for the different degrees of freedom (e.g., vector sum of amount of haptic feedback for each degree of freedom).

At step 712, the first amount of haptic feedback is combined with the second amount of haptic feedback to generate a combined amount of haptic feedback. Any suitable method for combining different amounts of haptic feedback can be used to generate the combined amount of haptic feedback. In some embodiments, the combined amount of haptic feedback is generated by linearly superimposing the first amount of haptic feedback with the second amount of haptic feedback.

At step 714, the combined amount of haptic feedback is applied to an input device. In some embodiments, the combined amount of haptic feedback is defined in a first space (e.g., Cartesian space). Applying the combined amount of haptic feedback to the input device includes converting the combined amount of haptic feedback into one or more joint commands for joint(s) of the input device using one or more kinematic models of the input device. The one or more joint commands cause the input device to resist input commands in one or more degrees of freedom of the input device.

In some embodiments, the combined amount of haptic feedback is applied to the input device from which the first command was received. In some embodiments, if the first command was received from a combination of multiple input devices, the combined amount of haptic feedback is applied to each input device. Alternately, the combined amount of haptic feedback could be divided between each input device (e.g., evenly distributed).

In some embodiments, the combined amount of haptic feedback is subject to a maximum (saturation) limit. If the combined amount of haptic feedback exceeds the maximum limit, then the combined amount of haptic feedback is reduced to keep the amount of haptic feedback within the maximum limit. In some embodiments, if the combined amount of haptic feedback is divided between multiple input devices, the divided amount is compared against the maximum limit. In some embodiments, a different maximum limit is specified for different degrees of freedom. If the combined amount of haptic feedback for a given degree of freedom exceeds the maximum limit for the given degree of freedom, then the combined amount of haptic feedback is reduced to the maximum limit.

In some embodiments, the computer-assisted system monitors the input commands received from the input devices. In response to receiving input command(s) consistent with operator input indicating that the drivable structure limit should be exceeded, the first amount of haptic feedback, the second amount of haptic feedback, and/or the combined amount of haptic feedback is adjusted. For example, the amount of haptic feedback could be decreased in response to receiving input for non-roll motion during a roll-constrained operation mode over a threshold period of time. As another example, the amount of haptic feedback could be decreased in response to detecting input device motion that exceeds a threshold distance and/or threshold acceleration.

As discussed above and further emphasized here, FIG. 7 is merely an example which should not unduly limit the scope of the claims. One of ordinary skill in the art would recognize many variations, alternatives, and modifications. In some embodiments, the haptic feedback includes haptic feedback based on other motion limits, in addition to or instead of the drivable structure limit, such as range of motion limits (e.g., of an instrument, manipulator, and/or the like), motion limits based on sensed or anticipated collision, and/or the like.

In sum, a computer-assisted system is configured to define one or more drivable structure limits that limit motion of a drivable structure. A drivable structure limit reduces or prevents motion along one or more degrees of freedom of one or more joints of the drivable structure or within a defined region around the drivable structure. The drivable structure limit is defined, for example, based on a type of procedure being performed by a drivable assembly that includes the drivable structure, a stage of the procedure, an operating mode of the drivable structure, and/or the like.

In addition to or instead of reducing or preventing motion of the drivable structure, in some embodiments, the computer-assisted system provides haptic feedback to an input device used by an operator. The haptic feedback is used to guide the operator towards commanding inputs that keep the drivable structure within the drivable structure limit(s). For example, the haptic feedback can be used to guide an operator in commanding movement of an imaging device about a field of view roll axis without commanding movement about a pitch or yaw axis.

Advantageously, the disclosed techniques enable the computer-assisted system to constrain motion of a drivable structure in order to avoid collisions, prevent movement of the drivable structure or proximal portions of the drivable structure from moving outside of a limit appropriate for a given scenario, guide users to input commanded movements that are limited to selected degree(s) of freedom, and/or the like. As a result, the disclosed techniques can increase efficiency and intuitiveness of the computer-assisted system, reduce power used by the system, and increase accuracy and precision of instrument motion.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A robotic system comprising:
   a drivable assembly comprising:
      a drivable structure,
      a first manipulator mechanically coupled to the drivable structure, and
      a second manipulator mechanically coupled to the drivable structure; and
   a processing system configured to perform operations comprising:
      receiving a first command, the first command indicating a first commanded motion for a first instrument mechanically coupled to the first manipulator, the first instrument having a first end effector, wherein the first manipulator and the first instrument together comprise a plurality of first links coupled by a plurality of first joints;
      determining a drivable structure limit based on at least one parameter selected from the group consisting of: a type of procedure being performed by the drivable assembly, a stage of the procedure being performed by the drivable assembly, and an operating mode of the drivable assembly, the drivable structure limit defining a limit for motion of the drivable structure;
      determining a first movement for effecting the first commanded motion, the first movement comprising a first relative motion of the first end effector relative to the drivable structure, and the first movement further comprising a drivable structure motion of the drivable structure as limited by the drivable structure limit; and
      driving the drivable assembly to perform the first movement.

2. The robotic system of claim 1, wherein:
performing only the drivable structure motion would cause a first caused motion of the first end effector simultaneously with a second caused motion of a second end effector, the second end effector being of a second instrument mechanically coupled to the second manipulator, wherein the second manipulator and the second instrument together comprise a plurality of second links coupled by a plurality of second joints; and
the operations further comprise: determining a second movement of the plurality of second joints to compensate for the second caused motion, wherein performing the second movement simultaneously with the drivable structure motion maintains a state of the second end effector, and driving the drivable assembly to perform the second movement simultaneously with performing the first movement.

3. The robotic system of claim 1, wherein the drivable structure limit comprises:
a hard limit, wherein the hard limit specifies a boundary that cannot be exceeded by motion of at least a portion of the drivable structure or at least a portion of an element rigidly attached to the drivable structure; or
a soft limit, wherein the soft limit specifies a region in which the processing system is to command resistance to motion of the portion of the drivable structure or of the element rigidly attached to the drivable structure; or
a range of motion limit for the portion of the drivable structure or of the element rigidly attached to the drivable structure; or
a position limit; or
a velocity limit.

4. The robotic system of claim 1, wherein the drivable structure limit comprises a plurality of motion limits, wherein different motion limits of the plurality of motion limits are associated with different degrees of freedom of the drivable structure.

5. The robotic system of claim 4, wherein the different motion limits impose different limits along different spatial directions of motion.

6. The robotic system of claim 1, wherein the first commanded motion is for the first end effector, and wherein determining the drivable structure limit comprises:
selecting, based on the at least one parameter, the drivable structure limit from a plurality of pre-defined limits stored in a memory of the robotic system; or
computing the drivable structure limit based on the at least one parameter.

7. The robotic system of claim 1, wherein:
the at least one parameter comprises the type of procedure being performed by the drivable assembly;
the robotic system comprises a medical robotic system; and
determining the drivable structure limit comprises: determining the drivable structure limit to be a more restrictive limit in response to the type of procedure being a procedure performed with the first instrument inserted into a natural orifice of a patient.

8. The robotic system of claim 7, wherein the at least one parameter further comprises:
the stage of the procedure being performed by the drivable assembly; or
the operating mode of the drivable assembly.

9. The robotic system of claim 1, wherein:
the at least one parameter comprises the stage of the procedure being performed by the drivable assembly;
the robotic system comprises a medical robotic system; and
determining the drivable structure limit comprises: determining the drivable structure limit to be a more restrictive limit for a later stage of the procedure as compared to an earlier stage of the procedure.

10. The robotic system of claim 1, wherein:
the at least one parameter comprises the stage of the procedure being performed by the drivable assembly; and
the operations further comprise:
determining a stage of the procedure being performed by the drivable assembly based on one or more types of instruments supported by the drivable assembly.

11. The robotic system of claim 1, wherein:
the at least one parameter comprises the operating mode of the drivable assembly;
the robotic system comprises a medical robotic system; and
determining the drivable structure limit comprises: determining the drivable structure limit to be a more restrictive limit in response to the operating mode being associated with narrower access.

12. The robotic system of claim 1, further comprising an input device for receiving the first command, wherein:
the drivable structure limit comprises a soft drivable structure limit, and the operations further comprise providing haptic feedback using the input device based on an amount that the first movement exceeds a boundary of the soft drivable structure limit; or
the operations further comprise providing haptic feedback using the input device based on a difference between the first movement and the first commanded motion; or
the drivable structure limit comprises a hard drivable structure limit, and the operations further comprise providing haptic feedback using the input device based on an amount that the first commanded motion exceeds the hard drivable structure limit; or
the drivable structure limit comprises the soft drivable structure limit and the hard drivable structure limit, and the operations further comprise providing haptic feedback using the input device based on a combination of a first amount of haptic feedback and a second amount of haptic feedback, the first amount being based on an amount that the first movement exceeds a boundary of the soft drivable structure limit, and the second amount being based on an amount that the first commanded motion exceeds the hard drivable structure limit or a difference between the first movement and the first commanded motion.

13. The robotic system of claim 1, wherein:
the drivable structure limit comprises a pitch limit on pitch motion of the drivable structure and a yaw limit on yaw motion of the drivable structure;
the drivable structure limit permits roll motion of the drivable structure; and
determining the first movement comprises:
determining a precursor motion for the drivable structure for effecting the first commanded motion, and
modifying the precursor motion based on the drivable structure limit to generate the drivable structure motion.

14. The robotic system of claim 13, wherein modifying the precursor motion comprises reducing at least one of a pitch motion of the precursor motion or a yaw motion of the precursor motion based on the drivable structure limit.

15. A method comprising:
receiving, by a processing system, a first command, the first command indicating a first commanded motion for a first instrument mechanically coupled to a first manipulator of a drivable assembly, the drivable assembly comprising a drivable structure, the first manipulator, and a second manipulator, the first manipulator mechanically coupled to the drivable structure, the second manipulator mechanically coupled to drivable structure, the first instrument having a first end effector, wherein the first manipulator and the first instrument together comprise a plurality of first links coupled by a plurality of first joints;
determining, by the processing system, a drivable structure limit based on at least one parameter selected from the group consisting of: a type of procedure being performed by the drivable assembly, a stage of the procedure being performed by the drivable assembly, and an operating mode of the drivable assembly, the drivable structure limit defining a limit for motion of the drivable structure;
determining a first movement for effecting the first commanded motion, the first movement comprising a first relative motion of the first end effector relative to the drivable structure, and the first movement further comprising a drivable structure motion of the drivable structure as limited by the drivable structure limit; and
driving the drivable assembly to perform the first movement.

16. The method of claim 15, wherein:
performing only the drivable structure motion would cause a first caused motion of the first end effector simultaneously with a second caused motion of a second end effector, the second end effector being of a second instrument mechanically coupled to the second manipulator, wherein the second manipulator and the second instrument together comprise a plurality of second links coupled by a plurality of second joints; and
the method further comprises: determining, by the processing system, a second movement of the plurality of second joints to compensate for the second caused motion, wherein performing the second movement simultaneously with the drivable structure motion maintains a state of the second end effector, and driving the drivable assembly to perform the second movement simultaneously with performing the first movement.

17. The method of claim 15, wherein:
the drivable structure limit comprises a plurality of motion limits; and
different motion limits of the plurality of motion limits are associated with different degrees of freedom of the drivable structure.

18. The method of claim 17, wherein the different motion limits impose different limits along different spatial directions of motion.

19. The method of claim 15, wherein the at least one parameter comprises the type of procedure being performed by the drivable assembly, and wherein determining the drivable structure limit comprises:
determining the drivable structure limit to be a more restrictive limit in response to the type of procedure being a procedure performed with the first instrument inserted into a natural orifice of a patient.

20. The method of claim 15, wherein the at least one parameter further comprises the stage of the procedure being performed by the drivable assembly, and wherein determining the drivable structure limit comprises:
determining the drivable structure limit to be a more restrictive limit for a later stage of the procedure as compared to an earlier stage of the procedure.

21. The method of claim 15, wherein the at least one parameter comprises the operating mode of the drivable assembly, and wherein determining the drivable structure limit comprises:
determining the drivable structure limit to be a more restrictive limit in response to the operating mode being associated with narrower access.

22. The method of claim 15, wherein:
the drivable structure limit comprises a pitch limit on pitch motion of the drivable structure and a yaw limit on yaw motion of the drivable structure;
the drivable structure limit permits roll motion of the drivable structure; and
determining the first movement comprises:
determining a precursor motion for the drivable structure for effecting the first commanded motion,
modifying the precursor motion based on the drivable structure limit to generate the drivable structure motion; and
modifying the precursor motion comprises reducing at least one of a pitch motion of the precursor motion or a yaw motion of the precursor motion based on the drivable structure limit.

23. One or more non-transitory machine-readable media comprising a plurality of machine-readable instructions which when executed by one or more processors are adapted to cause the one or more processors to perform a method comprising:
receiving a first command, the first command indicating a first commanded motion for a first instrument mechanically coupled to a first manipulator of a drivable assembly, the drivable assembly comprising a drivable structure, the first manipulator, and a second manipulator, the first manipulator mechanically coupled to the drivable structure, the second manipulator mechanically coupled to drivable structure, the first instrument having a first end effector, wherein the first manipulator and the first instrument together comprise a plurality of first links coupled by a plurality of first joints;
determining a drivable structure limit based on at least one parameter selected from the group consisting of: a type of procedure being performed by the drivable assembly, a stage of the procedure being performed by the drivable assembly, and an operating mode of the drivable assembly, the drivable structure limit defining a limit for motion of the drivable structure;
determining a first movement for effecting the first commanded motion, the first movement comprising a first relative motion of the first end effector relative to the drivable structure, and the first movement further comprising a drivable structure motion of the drivable structure as limited by the drivable structure limit; and
driving the drivable assembly to perform the first movement.

24. The one or more non-transitory machine-readable media of claim 23, wherein:
performing only the drivable structure motion would cause a first caused motion of the first end effector simultaneously with a second caused motion of a second end effector, the second end effector being of a second instrument mechanically coupled to the second manipulator, wherein the second manipulator and the second instrument together comprise a plurality of second links coupled by a plurality of second joints; and the method further comprises: determining a second movement of the plurality of second joints to compensate for the second caused motion, wherein performing the second movement simultaneously with the drivable structure motion maintains a state of the second end effector, and driving the drivable assembly to perform the second movement simultaneously with performing the first movement.

25. The one or more non-transitory machine-readable media of claim 23, wherein the drivable structure limit comprises a plurality of motion limits, and wherein different motion limits of the plurality of motion limits are associated with different degrees of freedom of the drivable structure.

* * * * *